US011232688B1

(12) United States Patent
Lemberger et al.

(10) Patent No.: US 11,232,688 B1
(45) Date of Patent: Jan. 25, 2022

(54) AUTO-CONFIGURATION FOR A MOTION DETECTOR OF A SECURITY DEVICE

(71) Applicant: AMAZON TECHNOLOGIES, INC., Seattle, WA (US)

(72) Inventors: Elliott Lemberger, Santa Monica, CA (US); Michael Jason Mitura, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 430 days.

(21) Appl. No.: 16/200,566

(22) Filed: Nov. 26, 2018

Related U.S. Application Data

(60) Provisional application No. 62/592,269, filed on Nov. 29, 2017.

(51) Int. Cl.
| | | |
|---|---|---|
| *G08B 13/196* | (2006.01) | |
| *G08B 29/24* | (2006.01) | |
| *G08B 13/19* | (2006.01) | |
| *H04N 7/18* | (2006.01) | |
| *H04N 5/232* | (2006.01) | |

(52) U.S. Cl.
CPC ....... *G08B 13/19695* (2013.01); *G08B 13/19* (2013.01); *G08B 13/1961* (2013.01); *G08B 13/1968* (2013.01); *G08B 13/19608* (2013.01); *G08B 13/19615* (2013.01); *G08B 13/19652* (2013.01); *G08B 13/19658* (2013.01); *G08B 13/19682* (2013.01); *G08B 29/24* (2013.01); *H04N 5/23299* (2018.08); *H04N 7/186* (2013.01)

(58) Field of Classification Search
None
See application file for complete search history.

(56) References Cited

U.S. PATENT DOCUMENTS

| | | | |
|---|---|---|---|
| 4,764,953 | A | 8/1988 | Chern et al. |
| 5,428,388 | A | 6/1995 | Von Bauer et al. |
| 5,760,848 | A | 6/1998 | Cho |
| 6,072,402 | A | 6/2000 | Kniffin et al. |
| 6,192,257 | B1 | 2/2001 | Ray |
| 6,271,752 | B1 | 8/2001 | Vaios |
| 6,429,893 | B1 | 8/2002 | Xin |
| 6,456,322 | B1 | 9/2002 | Marinacci |

(Continued)

FOREIGN PATENT DOCUMENTS

| | | |
|---|---|---|
| CN | 2585521 Y | 11/2003 |
| CN | 2792061 Y | 6/2006 |

(Continued)

*Primary Examiner* — Ricky Chin
(74) *Attorney, Agent, or Firm* — Lathrop GPM LLP

(57) ABSTRACT

Configuring motion detection by a security device. The security device includes a camera configured to capture images of an environment in front of the security device and a motion sensor for detecting motion within the environment. The system also includes a server and a client device that are interconnected by a network. An AI learning module interacts with a user of the client device to capture an image of the user within the environment in front of the security device, and determines parameters for the motion sensor based upon analysis of the image to determine a location of an exempt area relative to the security device. The motion detector is configured based upon the determined parameters.

17 Claims, 27 Drawing Sheets

(56) References Cited

U.S. PATENT DOCUMENTS

| | | |
|---|---|---|
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 6/2006 | Lee |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,489,745 B1* | 11/2016 | Heitz, III .................. H04N 7/18 |
| 9,508,239 B1 | 11/2016 | Harrison et al. |
| 9,696,457 B1* | 7/2017 | Mattes ...................... G01J 5/06 |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,387,487 B1* | 8/2019 | Svendsen ............. G06F 16/587 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2012/0169871 A1* | 7/2012 | Sablak ............... H04N 21/2187 348/143 |
| 2013/0057695 A1 | 3/2013 | Huisking |
| 2014/0204362 A1* | 7/2014 | Iwasawa ................. G01S 17/42 356/5.01 |
| 2015/0035987 A1 | 2/2015 | Fernandez |
| 2015/0077555 A1* | 3/2015 | Scalisi .................... H04M 11/00 348/143 |
| 2015/0077567 A1* | 3/2015 | Scalisi ............. G08B 13/19619 348/152 |
| 2015/0092055 A1* | 4/2015 | Scalisi ................. G08B 21/088 348/143 |
| 2016/0044287 A1* | 2/2016 | Scalisi ................ H04M 1/0291 348/159 |
| 2016/0261824 A1* | 9/2016 | Scalisi ................. H04M 11/025 |
| 2018/0174413 A1* | 6/2018 | Siminoff ............ G08B 13/1968 |
| 2018/0176512 A1* | 6/2018 | Siminoff .......... G08B 13/19602 |
| 2018/0359424 A1* | 12/2018 | Shibusawa ........... H04N 5/2352 |
| 2019/0311201 A1* | 10/2019 | Selinger ............. G06K 9/00744 |
| 2019/0332897 A1* | 10/2019 | Chen .................. G06K 9/00771 |
| 2020/0005573 A1* | 1/2020 | Yuan .................... G06K 9/4628 |

FOREIGN PATENT DOCUMENTS

| | | |
|---|---|---|
| EP | 0944883 B1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A2 | 4/2001 |
| JP | 2002-033839 A2 | 1/2002 |
| JP | 2002-125059 A2 | 4/2002 |
| JP | 2002-342863 A2 | 11/2002 |
| JP | 2002-344640 A2 | 11/2002 |
| JP | 2002-354137 A2 | 12/2002 |
| JP | 2002-368890 A2 | 12/2002 |
| JP | 2003-283696 A2 | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 09-008925 A | 1/2009 |
| WO | WO 199839894 A1 | 9/1998 |
| WO | WO 0113638 A1 | 2/2001 |
| WO | WO 200193220 A1 | 12/2001 |
| WO | WO 2002085019 A1 | 10/2002 |
| WO | WO 2003028375 A1 | 4/2003 |
| WO | WO 2003096696 A1 | 11/2003 |
| WO | WO 2006038760 A1 | 4/2006 |
| WO | WO 2006067782 A1 | 6/2006 |
| WO | WO 2007125143 A1 | 8/2007 |

* cited by examiner

AUTO-CONFIGURATION FOR A MOTION DETECTOR OF A SECURITY DEVICE

RELATED APPLICATION

This application claims priority to provisional application Ser. No. 62/592,269, titled "Auto-Configuration for a Motion Detector of a Security Device," filed on Nov. 29, 2017, and incorporated herein by reference in its entirety.

BACKGROUND

A security device includes a camera and a motion detector. The motion detector detects motion in its field of view and the camera is triggered based upon the motion detection to capture one or more images. An alert is transmitted to a user of the security device to notify the user of the motion detection. The motion detected by the motion detector may occur in an area not of interest to the user. For example, the field of view of the motion detector may include a street, and a user alert may be generated each time a car on the street passes by the security device. The user may consider such alerts associated with motion in areas not of interest to the user to be a nuisance.

DETAILED DESCRIPTION OF THE EMBODIMENTS

Figure 1:
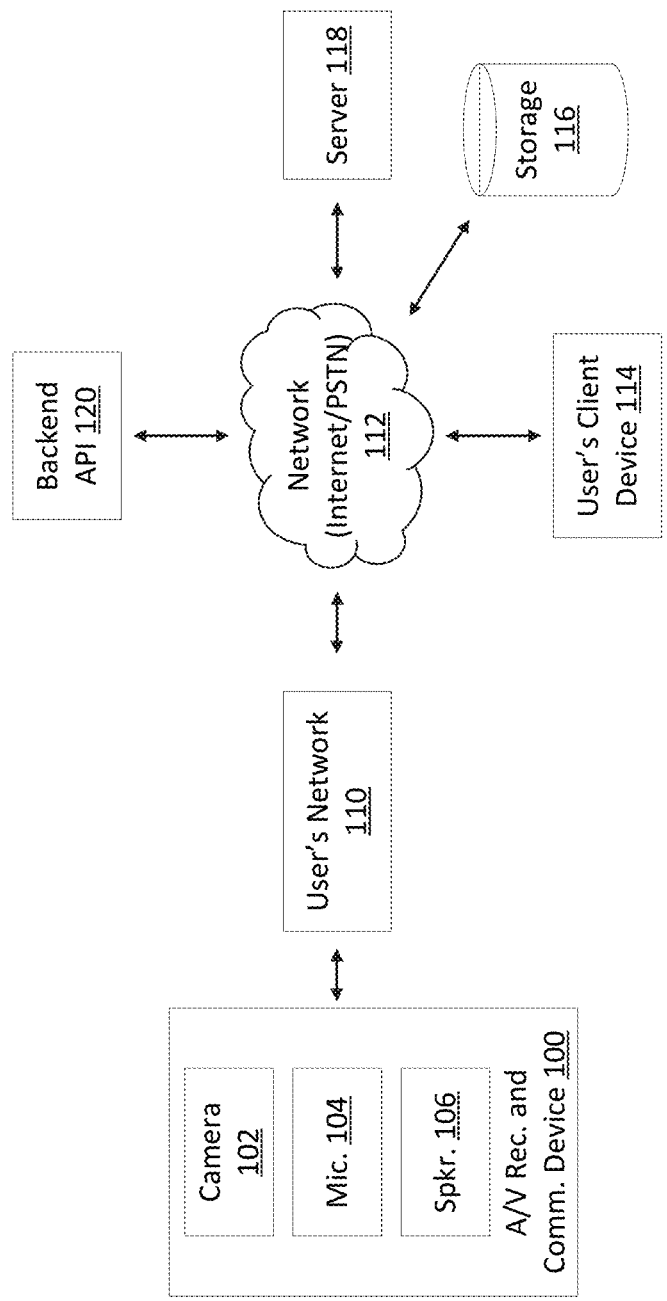
FIG. 1 is a functional block diagram illustrating a system for streaming and storing audio/video content captured by a device, according to an embodiment.

The following detailed description describes the present embodiments with reference to the drawings. In the drawings, reference numbers label elements of the present embodiments. These reference numbers are reproduced below in connection with the discussion of the corresponding drawing features.

One aspect of the present embodiments includes the realization that a motion detector of a security device, unless correctly configured, may detect motion within areas of an environment that are not of interest to a user of the security device, thereby generating user alerts that are unhelpful and bothersome. Another aspect of the present embodiments includes the realization that configuration of the motion detector of the security device to ignore motion in these areas is difficult, particularly where there is no visual feedback to the user of the areas where the motion detector detects motion relative to the environment. The present embodiments solve these problems by automatically configuring the motion detector to ignore motion within areas of the environment that are not of interest to the user. The present embodiments instruct the user to stand a predefined distance in front of the security device and use a camera of the security device to capture an image of the environment containing the user. Image processing techniques are used to isolate in the image each of the user and an area not of interest to the user. Because the distance between the user and the camera is known, the distance between the camera and the area not of interest to the user may be accurately estimated. The estimated distance between the camera and the area not of interest to the user may be used to configure the motion detector so that any motion occurring in the area not of interest to the user is disregarded.

Another aspect of the present embodiments includes the realization that the accuracy of the estimated distances between the motion detector and areas not of interest to the user may be increased over time by taking into account a user input outlining the distance between the motion detector and at least one such area in which motion is to be disregarded.

With reference to FIG. 1, the present embodiments include an audio/video recording and communication device 100, also known as a security device 100. While the present disclosure provides numerous examples of methods and systems including audio/video recording and communication doorbells, the present embodiments are equally applicable for audio/video recording and communication devices other than doorbells. For example, the present embodiments may include one or more audio/video recording and communication security cameras instead of, or in addition to, one or more audio/video recording and communication doorbells. An example audio/video recording and communication security camera may include substantially all of the structure and/or functionality of the doorbells described herein, but without a front button and related components.

The audio/video recording and communication device 100 may be located near the entrance to a structure (not shown), such as a dwelling, a business, a storage facility, etc. The audio/video recording and communication device 100 includes a camera 102, a microphone 104, and a speaker 106. The camera 102 may include, for example, a high definition (HD) video camera, such as one configured for capturing video images at an image display resolution of 720p, or 1080p, or better. While not expressly shown in FIG. 1, the audio/video recording and communication device 100 may also include other hardware and/or components, such as a housing, a communication module (which may facilitate wired and/or wireless communication with other devices), one or more motion detectors (and/or other types of sensors), a processor, a memory, a button, etc. The audio/video recording and communication device 100 may further include similar componentry and/or functionality as the wireless communication doorbells described in U.S. Pat. No. 9,584,775 and US Patent Application Number 2015/0022618 (application Ser. No. 14/334,922), both of which are incorporated herein as Appendix A and Appendix B, respectively.

With further reference to FIG. 1, the audio/video recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the audio/video recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components configured for displaying streaming and/or recorded video images. The user's client device 114 may also comprise a speaker and related components configured for broadcasting streaming and/or recorded audio, and may also comprise a microphone. The audio/video recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN, the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network 112 may further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

In certain embodiments, when a person (may be referred to interchangeably as "visitor") arrives at the audio/video recording and communication device 100, the audio/video recording and communication device 100 detects the visitor's presence and begins capturing video images within a field of view of camera 102. The audio/video recording and communication device 100 may also capture audio through microphone 104. The audio/video recording and communication device 100 may detect the visitor's presence by detecting motion using the camera 102 and/or a motion detector, and/or by detecting that the visitor has pressed a front button of the audio/video recording and communication device 100 (for example, when the audio/video recording and communication device 100 is a doorbell).

In response to the detection of the visitor, the audio/video recording and communication device 100 sends an alert to the user's client device 114 (FIG. 1) via the user's network 110 and the network 112. The audio/video recording and communication device 100 also sends streaming video, and may also send streaming audio, to the user's client device 114. If the user answers the alert, two-way audio communication may then occur between the visitor and the user through the audio/video recording and communication device 100 and the user's client device 114. The user may view the visitor throughout the duration of the call, but the visitor cannot see the user (unless the audio/video recording and communication device 100 includes a display, which it may in certain embodiments).

The video images captured by the camera 102 of the audio/video recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to the user's client device 114.

With further reference to FIG. 1, the system may further include a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicates with one another using their public APIs. In some embodiments, the API backend may hold the bulk of the user data and offer the user management capabilities, leaving the clients to have very limited state.

The backend API 120 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
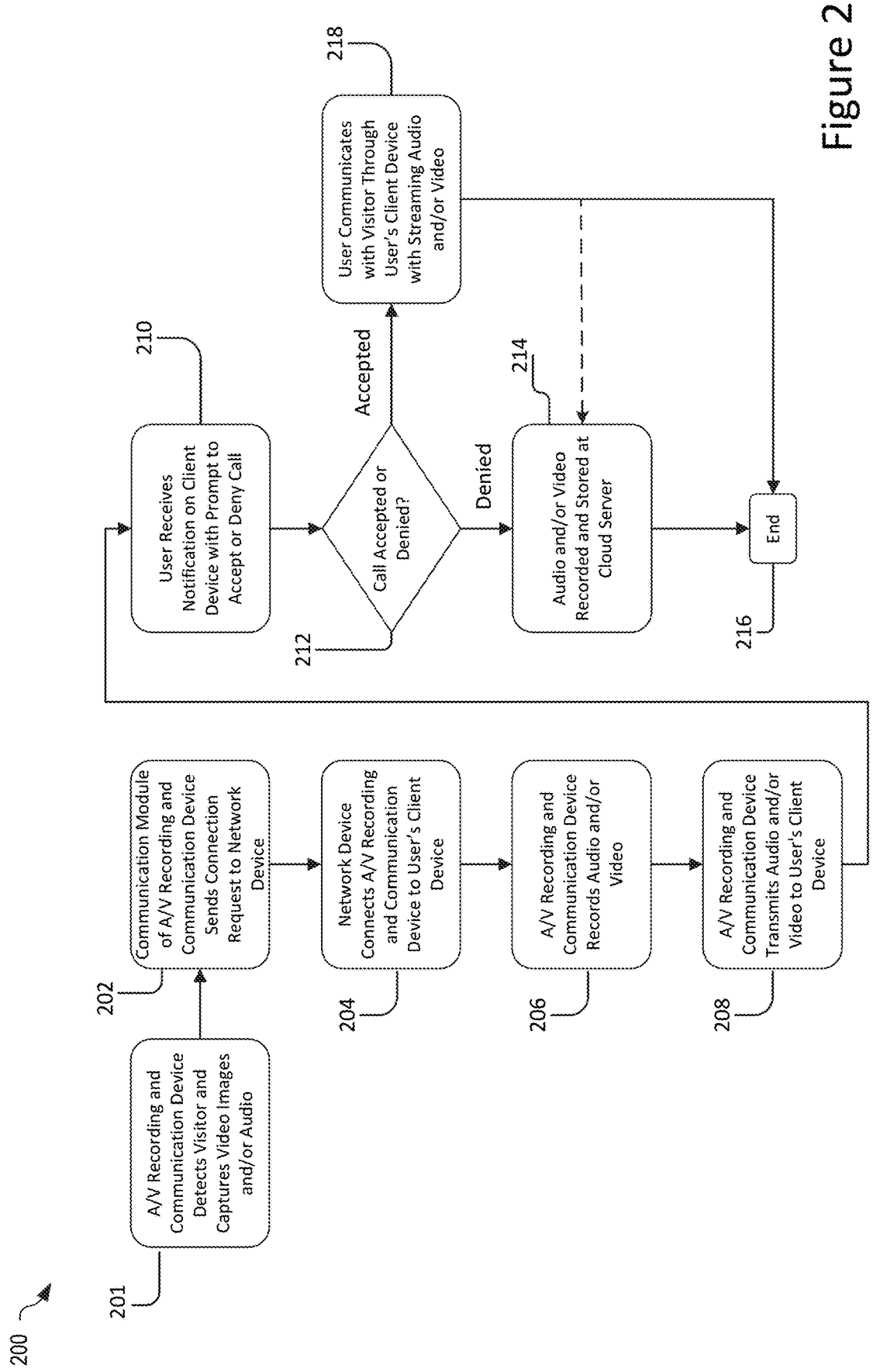
FIG. 2 is a flowchart illustrating a process for streaming and storing audio/video content from the device of FIG. 1, according to an embodiment.

FIG. 2 is a flowchart illustrating a process 200 for streaming and storing audio/video content from the audio/video recording and communication device 100, in an embodiment. At block 201, the audio/video recording and communication device 100 detects the visitor's presence and captures video images within a field of view of the camera 102. The audio/video recording and communication device 100 may also capture audio through the microphone 104. As described above, the audio/video recording and communication device 100 may detect the visitor's presence by detecting motion using the camera 102 and/or a motion detector, and/or by detecting that the visitor has pressed a front button of the audio/video recording and communication device 100 (for example, when the audio/video recording and communication device 100 is a doorbell). Also as described above, the video recording/capture may begin when the visitor is detected, or may begin earlier, as described below.

At block 202, a communication module of the audio/video recording and communication device 100 sends a connection request, via the user's network 110 and the network 112, to a device in the network 112. For example, the network device to which the request is sent may be a server such as the server 118. The server 118 may include a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block 204 the network device may connect the audio/video recording and communication device 100 to the user's client device 114 through the user's network 110 and the network 112. At block 206, the audio/video recording and communication device 100 may record available audio and/or video data using the camera 102, the microphone 104, and/or any other device/sensor available. At block 208, the audio and/or video data is transmitted (streamed) from the audio/video recording and communication device 100 to the user's client device 114 via the user's network 110 and the network 112. At block 210, the user may receive a notification on the user's client device 114 with a prompt to either accept or deny the call.

At block 212, the process 200 determines whether the user has accepted or denied the call. If the user denies the notification, then the process 200 advances to block 214, where the audio and/or video data is recorded and stored at a cloud server. The session then ends at block 216 and the connection between the audio/video recording and communication device 100 and the user's client device 114 is terminated. If, however, the user accepts the notification, the process 200 proceeds with block 218 where the user communicates with the visitor through the user's client device 114 while audio and/or video data captured by the camera 102, the microphone 104, and/or other devices/sensors, is streamed to the user's client device 114. At the end of the call, the user may terminate the connection between the user's client device 114 and the audio/video recording and communication device 100 and the session ends at block 216. In some embodiments, the audio and/or video data may be recorded and stored at a cloud server (block 214) even if the user accepts the notification and communicates with the visitor through the user's client device 114.

Figure 3:
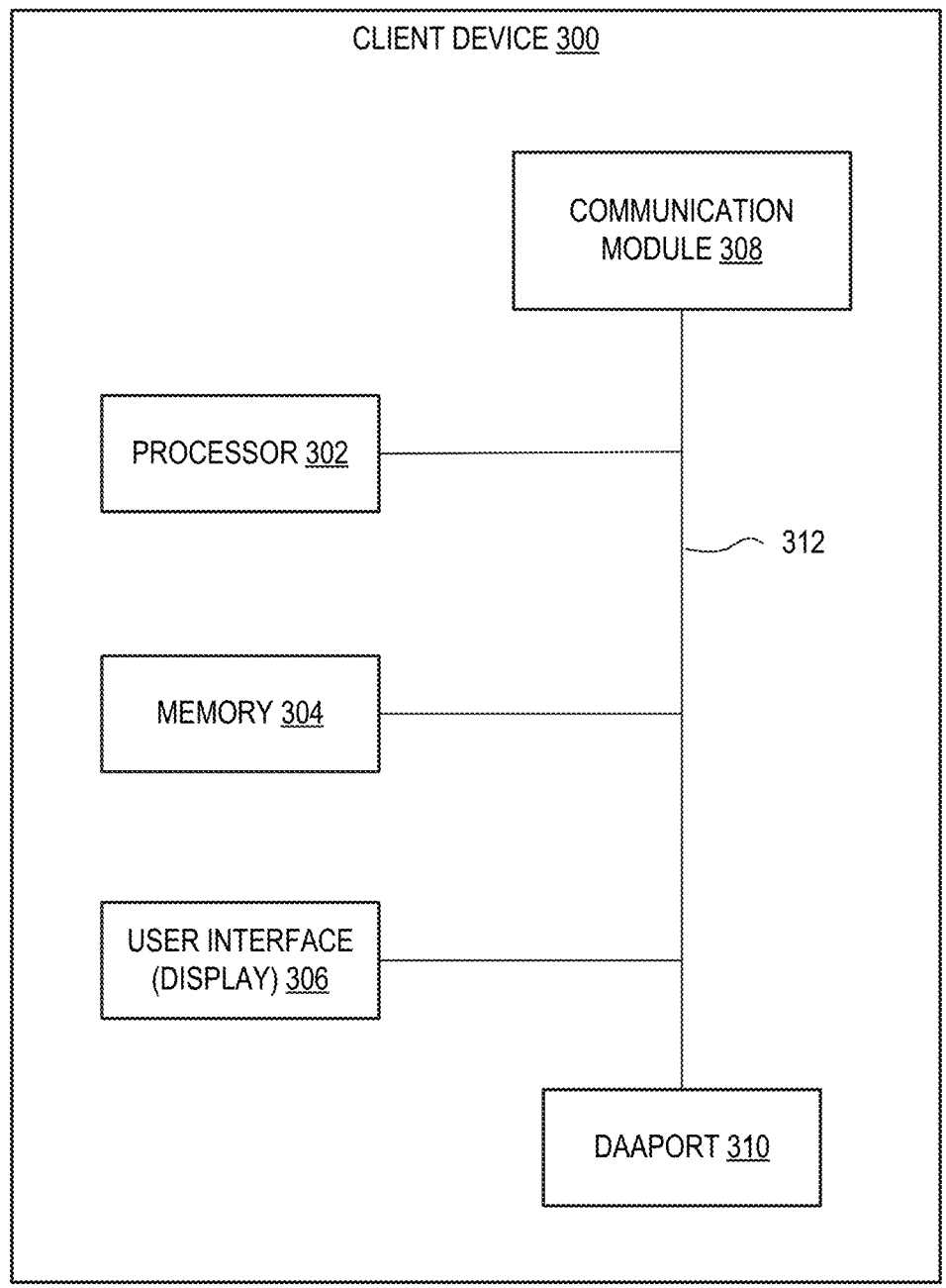
FIG. 3 is a functional block diagram of a client device on which the present embodiments may be implemented according to various aspects of the present disclosure.

FIG. 3 is a functional block diagram of a client device 300 on which the present embodiments may be implemented according to various aspects of the present disclosure. The user's client device 114 described with reference to FIG. 1 may include some or all of the components and/or functionality of the client device 300. The client device 300 is, for example, a smartphone.

The client device 300 includes a processor 302, a memory 304, a user interface 306, a communication module 308, and a dataport 310. These components are communicatively coupled together by an interconnect bus 312. The processor 302 may include any processor used in smartphones and/or portable computing devices, such as an ARM processor (a processor based on the RISC (reduced instruction set computer) architecture developed by Advanced RISC Machines (ARM).). In certain embodiments, the processor 302 includes one or more other processors, such as one or more microprocessors, and/or one or more supplementary co-processors, such as math co-processors.

The memory 304 may include both operating memory, such as random access memory (RAM), as well as data storage, such as read-only memory (ROM), hard drives, flash memory, or any other suitable memory/storage element. The memory 304 may include removable memory elements, such as a CompactFlash card, a MultiMediaCard (MMC), and/or a Secure Digital (SD) card. In certain embodiments, the memory 304 includes a combination of magnetic, optical, and/or semiconductor memory, and may include, for example, RAM, ROM, flash drive, and/or a hard disk or drive. The processor 302 and the memory 304 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 302 may be connected to the memory 304 via the dataport 310.

The user interface 306 may include any user interface or presentation elements suitable for a smartphone and/or a portable computing device, such as a keypad, a display screen, a touchscreen, a microphone, and a speaker. The communication module 308 is configured to handle communication links between the client device 300 and other, external devices or receivers, and to route incoming/outgoing data appropriately. For example, inbound data from the dataport 310 may be routed through the communication module 308 before being directed to the processor 302, and outbound data from the processor 302 may be routed through the communication module 308 before being directed to the dataport 310. The communication module 308 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 310 may be any type of connector used for physically interfacing with a smartphone and/or a portable computing device, such as a mini-USB port or an IPHONE®/IPOD® 30-pin connector or LIGHTNING® connector. In other embodiments, the dataport 310 may include multiple communication channels for simultaneous communication with, for example, other processors, servers, and/or client terminals.

The memory 304 may store instructions for communicating with other systems, such as a computer. The memory 304 may store, for example, a program (e.g., computer program code) adapted to direct the processor 302 in accordance with the present embodiments. The instructions also may include program elements, such as an operating system. While execution of sequences of instructions in the program causes the processor 302 to perform the process steps described herein, hard-wired circuitry may be used in place of, or in combination with, software/firmware instructions for implementation of the processes of the present embodiments. Thus, the present embodiments are not limited to any specific combination of hardware and software.

Motion Detector Auto Configuration

As discussed above, one aspect of the present embodiments includes the realization that a motion detector of a security device, unless correctly configured, may detect motion within areas of an environment that are not of interest to a user of the security device, thereby generating user alerts that are unhelpful and bothersome. Another aspect of the present embodiments includes the realization that configuration of the motion detector of the security device to ignore motion in these areas is difficult, particularly where there is no visual feedback to the user of the areas where the motion detector detects motion relative to the environment. The present embodiments solve these problems by automatically configuring the motion detector to ignore motion within areas of the environment that are not of interest to the user. The present embodiments instruct the user to stand a predefined distance in front of the security device and use a camera of the security device to capture an image of the environment containing the user. Image processing techniques are used to isolate in the image each of the user and an area not of interest to the user. Because the distance between the user and the camera is known, the distance between the camera and the area not of interest to the user may be accurately estimated. The estimated distance between the camera and the area not of interest to the user may be used to configure the motion detector so that any motion occurring in the area not of interest to the user is disregarded.

Another aspect of the present embodiments includes the realization that the accuracy of the estimated distances between the motion detector and areas not of interest to the user may be increased over time by taking into account a user input outlining the distance between the motion detector and at least one such area in which motion is to be disregarded.

Figure 4:
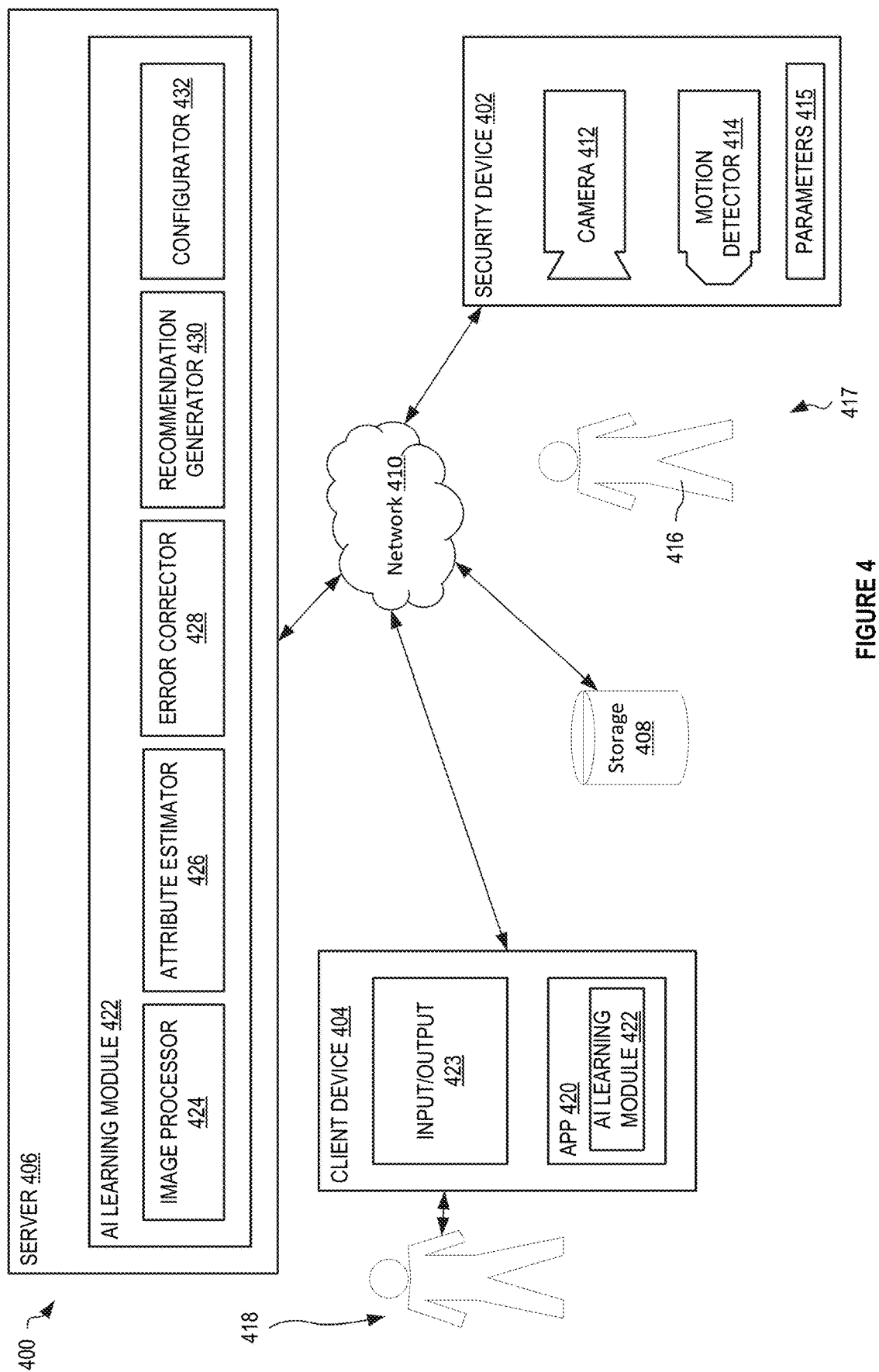
FIG. 4 is a functional block diagram illustrating a security system for detecting motion and for streaming and storing audio/video content, according to an embodiment.

With reference to FIG. 4, the present embodiments include a security system 400, also known as a monitoring system 400. The security system 400 may include a security device 402, a client device 404, a server 406, and a storage device 408, each of which may be in communication with a network 410. The security device 402, the client device 404, the server 406, and the storage device 408 may include some or all of the components and/or functionality of the audio/video recording and communication device 100, the user's client device 114, the server 118, and the storage device 116, respectively. The network 410 may be a wired and/or a wireless network and may include all or part of the functionality of the user's network 110 and/or the network 112. For example, a user 418 may configure a doorbell embodiment (see FIG. 24) of the security device 402 at a front door of a residence such that it may detect people approaching the front door.

The security device 402 may include a camera 412 and a motion detector 414. The camera 412 may be, for example, a video camera with high definition HD resolution, but may be any other type of camera. The motion detector 414 may use one or more of a passive infrared (PIR) sensor (e.g., a pyroelectric sensor), a microwave sensor, an area reflective type motion sensor, an ultrasonic motion sensor, a vibration motion sensor, a dual technology motion sensor, or any other type of kind of motion sensor. The security device 402 may, in embodiments, also include other hardware and/or components, such as a housing, a communication module, a processor, a memory, a button, a speaker, a microphone, etc., as discussed above for the security device 100. In alternative embodiments, the security device 402 may use the camera to detect motion, for example by comparing successive video frames and determining whether at least a threshold number of pixels have changed from a first frame to a second frame.

In such embodiments, the security device 402 may or may not include the separate motion detector 414.

The security device 402 may use the motion detector 414 to detect motion of a person 416 (e.g., a visitor) within an environment 417 in front of the security device 402. The person 416 may be a visitor, an intruder, or another person or persons in the field of view of the motion detector 414. The security device 402 may use one or more of numerous motion sensing techniques to detect the person 416. For example, where the motion detector 414 is a PIR sensor, it may be configured to detect the person 416 by measuring a change in the amount of infrared radiation impinging on the motion detector 414. More specifically, as the person 416 enters the field of view of the motion detector 414, the temperature at that point in the sensor's field of view may rise from ambient (e.g., room) temperature to body temperature. The resulting change in infrared radiation may cause a change in an output (e.g., an output voltage) of the motion detector 414, which may be interpreted as detected motion. In embodiments, the camera 412 may initiate recording video (and/or audio) upon the detection of the person 416, and the security device 402 may send an alert to the client device 404 over the network 410 to apprise the user 418 of the detection of the person 416. The user 418 may be, for example, the owner and/or operator of the client device 404 and/or the security device 402. The streaming video and/or audio may be stored in the storage device 408, e.g., a cloud storage device.

The client device 404 may include a client application 420 and an input/output device 423. The client application 420 may be software and/or firmware that contains machine-readable instructions executed by a client device processor to perform the functionality of the client device 404 as described herein. The input/output device 423 may comprise any suitable input or output device, such as a display, a speaker, a microphone, a touch screen, etc. When the security device 402 detects the person 416 and communicates an alert to the client device 404, the user 418 may use the client application 420 and the input/output device 423 to communicate with the person 416 via the security device 402 and the network 410.

Detection by the motion detector 414 may be triggered by motion associated with someone or something other than the person 416. For example, if a car, bus, bird, etc. comes into the field of view of the motion detector 414, the infrared radiation impinging on the motion detector 414 may resultantly change to trigger the detection. In response to the detection, the security device 402 may control the camera 412 to capture images of the environment 417 that may be recorded and an alert may be sent to the client device 404.

Figure 5:
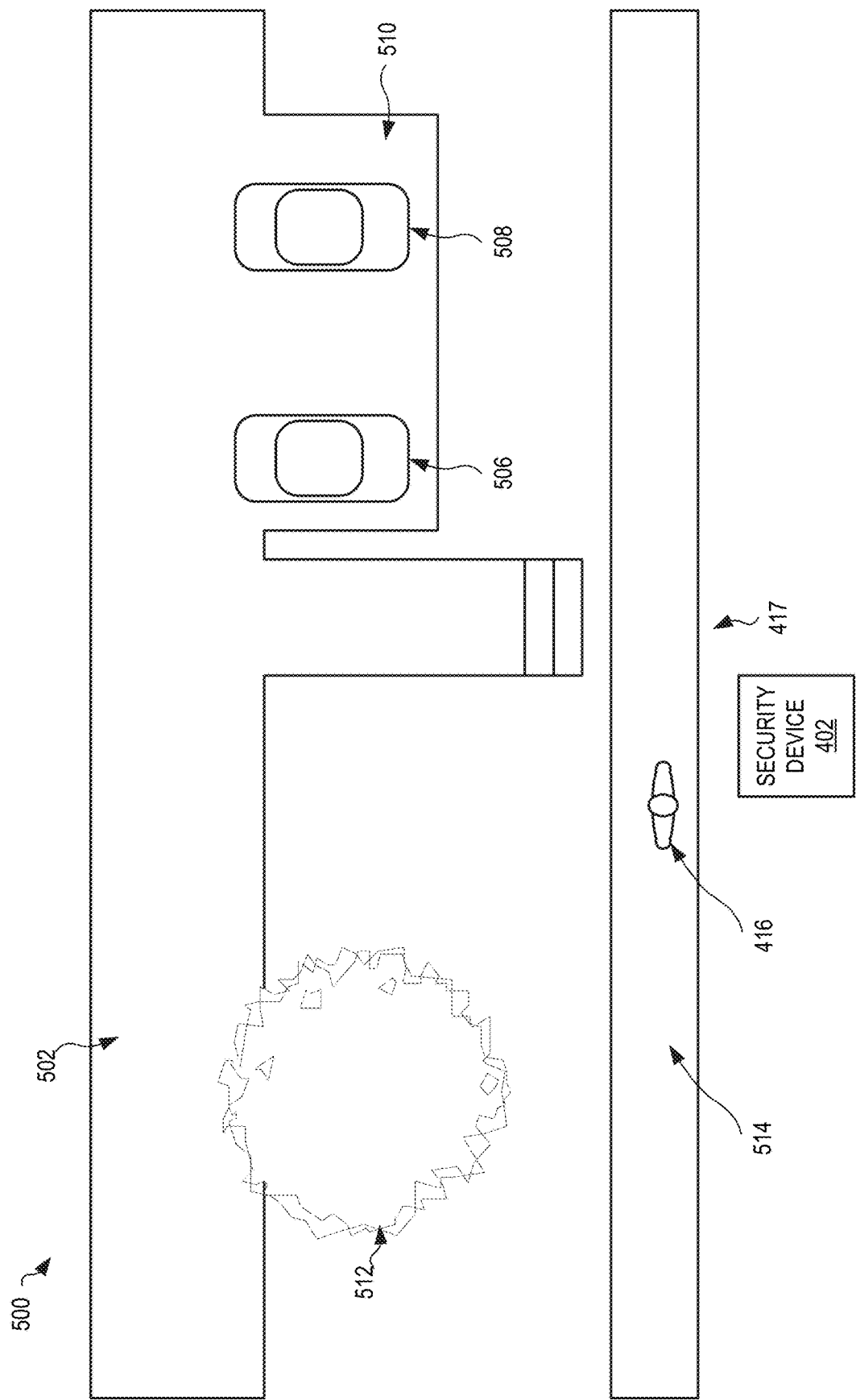
FIGS. 5-7 are plan views of example scenarios monitored by the security system of FIG. 4, according to various embodiments.

FIG. 5 shows an example scenario 500 of the environment 417 that includes a street 502, and vehicles 506 and 508 that are parked in a parking lot 510. The street 502 has a tree 512 proximate thereto. The person 416 is shown on a pathway 514 (e.g., a sidewalk) in front of the security device 402. The security device 402 may be, for example, affixed to a structure (e.g., a door of a house in which the user 418 resides (not expressly shown in FIG. 5)). As the person 416 enters the field of view of the motion detector 414 of the security device 402, the motion detector 414 may detect motion of the person 416 (e.g., by measuring the change in the amount of infrared radiation impinging on the motion detector 414). In response to the detected motion, the security device 402 may control the camera 412 to capture images of the environment 417 that may be recorded, and an alert may be sent to the client device 404 with a prompt to either accept or deny a call with the person 416. The user 418, if he or she so desires, may accept the call and communicate with the person 416 as described above with reference to FIGS. 1 and 2.

Figure 6:
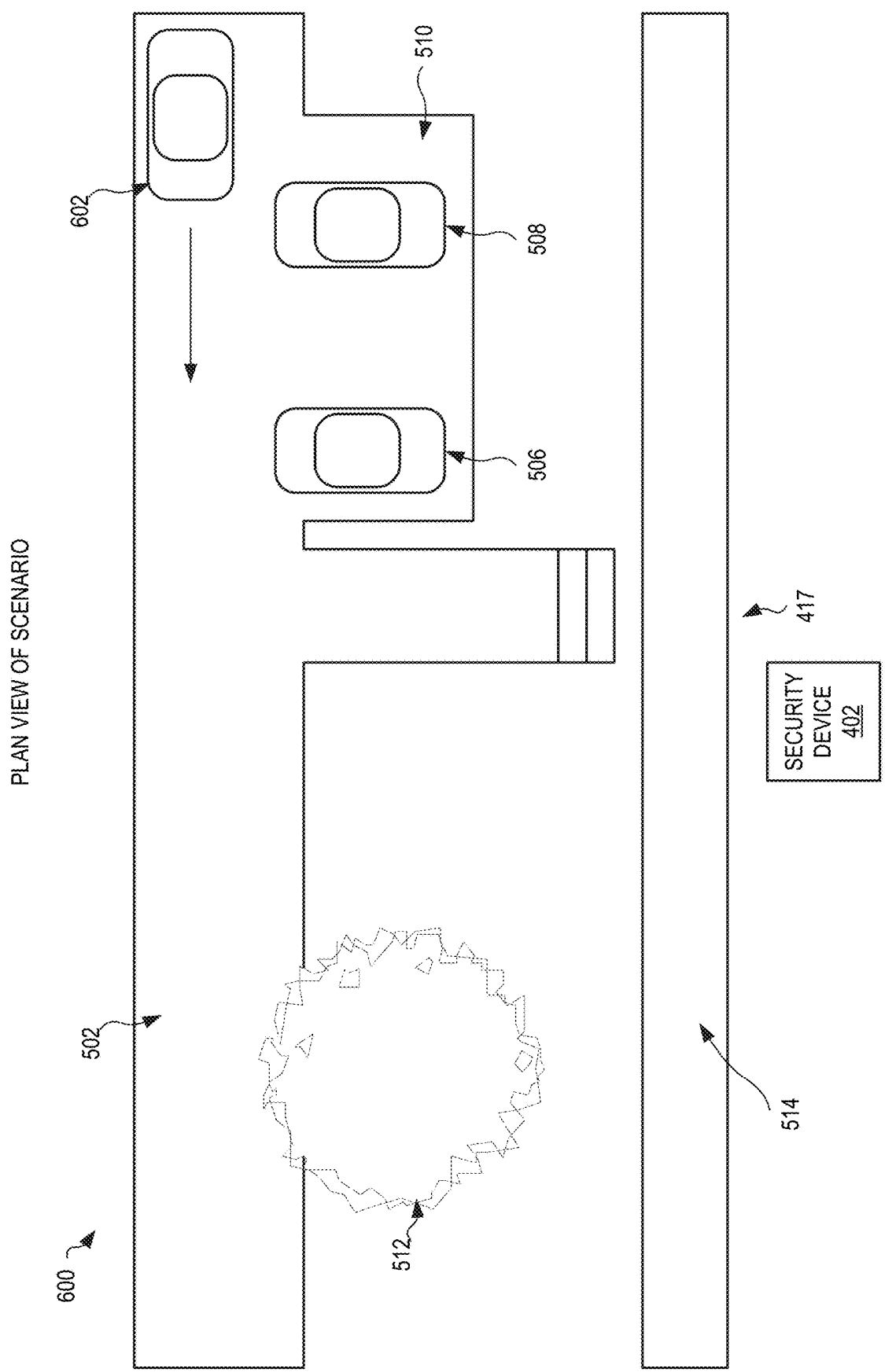

FIG. 6 shows another example scenario 600 of the environment 417 that is generally identical to the scenario 500 of FIG. 5, except that the person 416 is absent from the scenario 600 and a vehicle 602 is traveling along the street 502. The vehicle 602 is a large object that may include an internal combustion engine having a temperature higher than the ambient temperature of the environment 417, and may therefore be detected by the motion detector 414 of the security device 402. Thus, the user 418 may receive an alert indicative of the vehicle 602's motion, and may consider such an alert to be a nuisance.

Figure 7:
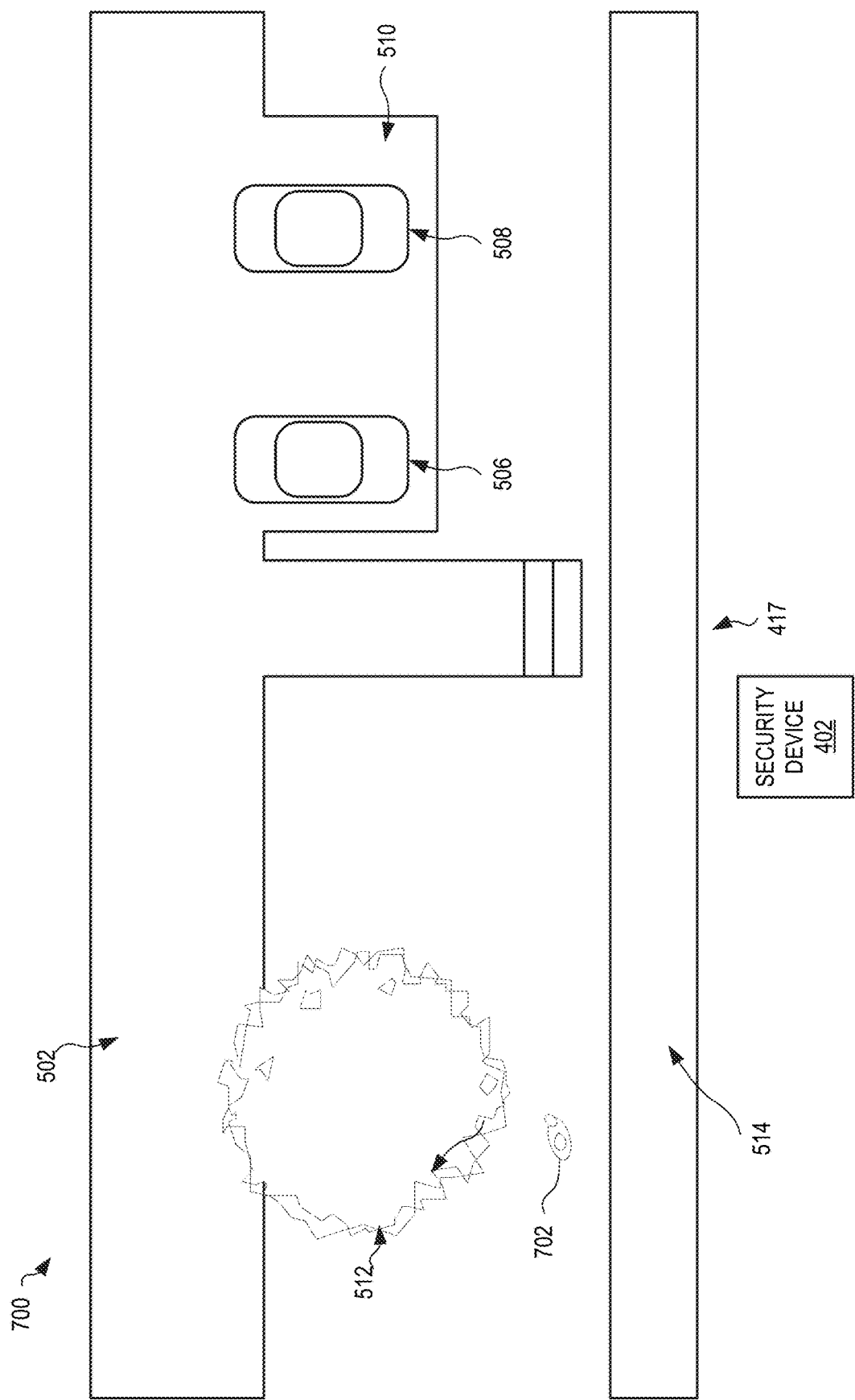

FIG. 7 shows an example scenario 700 of the environment 417 that is generally identical to the scenario 500 of FIG. 5, except that the person 416 is absent from the scenario 700 and a bird 702 is flying near the tree 512. Where the motion detector 414 detects the flying bird 702, a resulting alert sent to the client device 404 may also be considered a nuisance by the user 418.

Nuisance alerts, such as those generated by passing vehicles and birds, can reduce the effectiveness of the security device 402. For example, if the street 502 were busy with traffic, the user 418 may be inundated with unhelpful alerts triggered by the detection of the many vehicles traveling on the street 502. Such unhelpful alerts, in addition to being a nuisance, may lead to "alert fatigue" for the user 418, causing the user to ignore potentially important alerts generated in response to the detection of the person 416. The present embodiments help to solve the problem of alert fatigue, as described below.

To eliminate, or at least reduce, unhelpful alerts, the present embodiments configure the motion detector 414 to ignore motion (of objects, animals, persons, etc.) in certain areas. For example, with reference to FIGS. 5-7, it may be desirable for the motion detector 414 to ignore cars traveling on the street 502 and to ignore animals, such as birds, near the tree 512. The security system 400 may, in embodiments, automatically configure the motion detector 414 to ignore motion in such areas.

Figure 8:
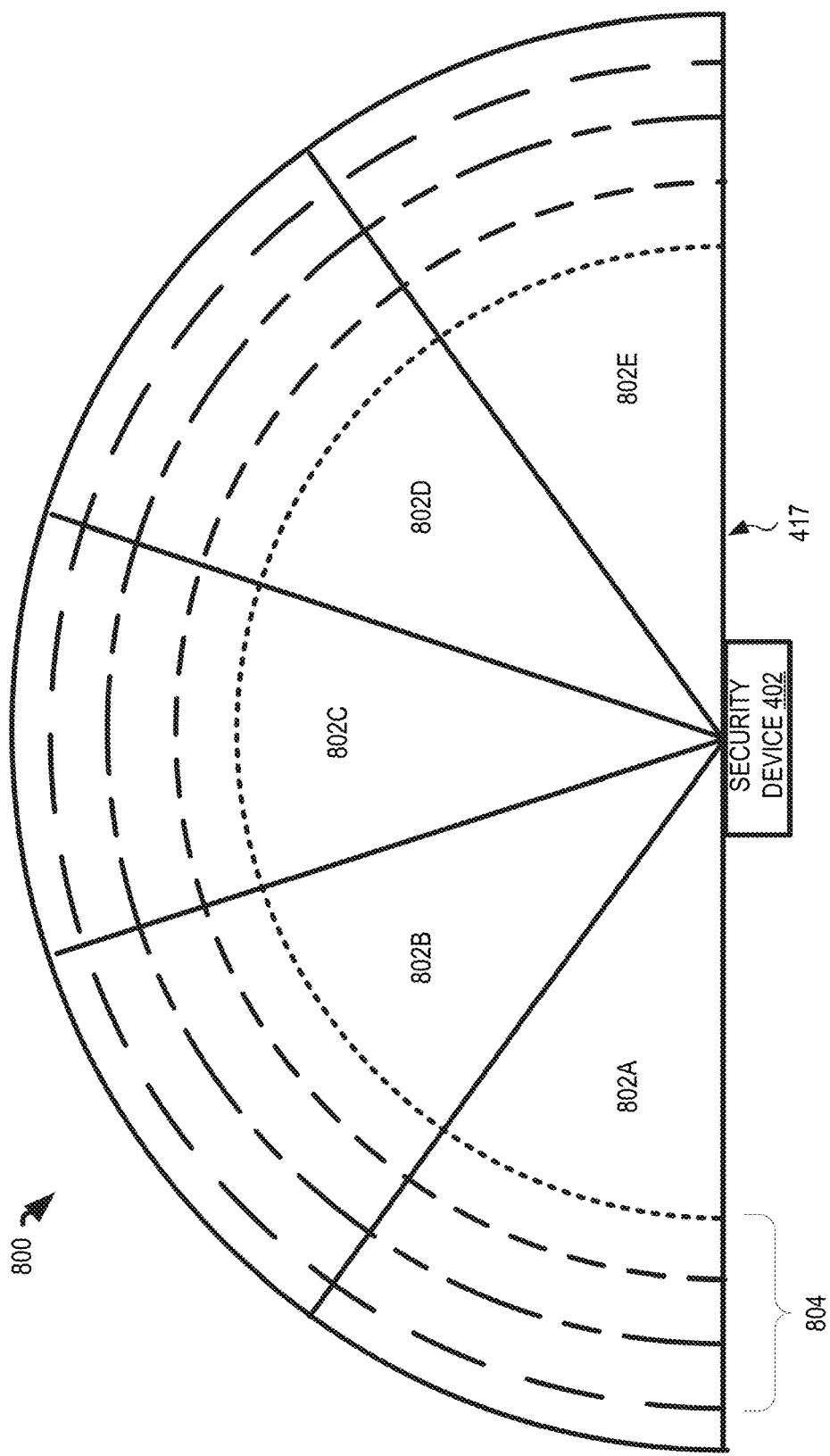
FIG. 8 is a functional block diagram illustrating one example of a detection region associated with a motion detector of the security system of FIG. 4, in an embodiment.

FIG. 8 shows a detection region 800 associated with the motion detector 414 of the security device 402. In the example of FIG. 8, the motion detector 414 may be a plurality of PIR sensors capable of detecting motion within the detection region 800 based upon a plurality of motion detection zones 802 and a sensitivity range. The detection region 800 shown in FIG. 8 is merely one example, and other motion detectors usable with the present embodiments may have detection regions having different characteristics, such as different shapes, different numbers of zones, etc. In the example of FIG. 8, the detection region 800 is divided into five motion detection zones 802A, 802B, 802C, 802D, and 802E, where the sensitivity of the motion detector 414 may be adjusted to increase and decrease the range of the motion detection zones 802, as indicated by the dashed arcs 804.

Figure 9:
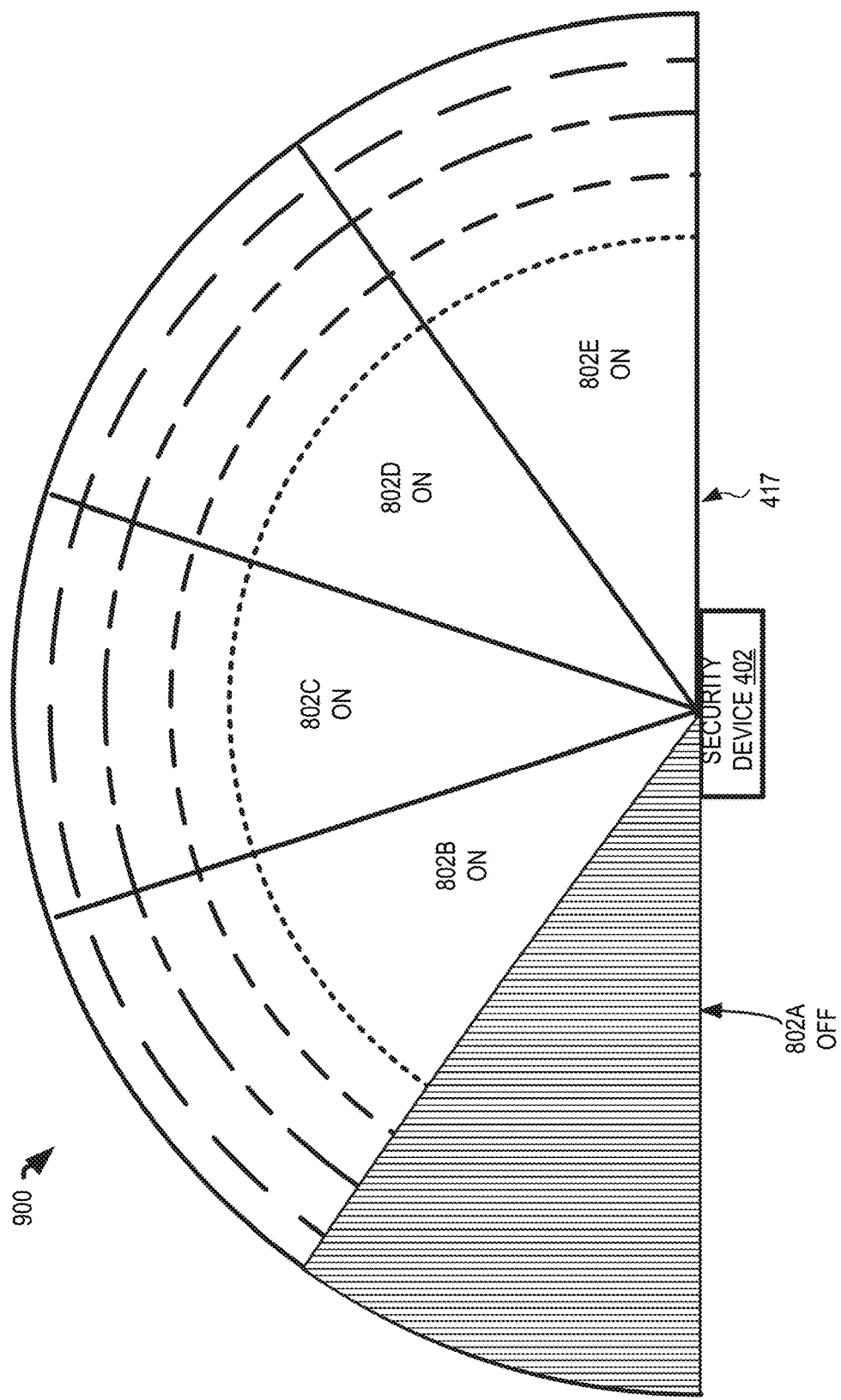
FIG. 9 is a functional block diagram illustrating a change in an operational state of a zone of the detection region of FIG. 8.

Embodiments of the present disclosure may allow for the operational state of each of the zones 802A-802E to be independently controlled (e.g., each of zones 802A-802E may be independently turned on and off). For example, FIG. 9 shows a detection region 900 that is generally identical to the detection region 800, except that zone 802A is turned off. Each zone that is turned off (e.g., zone 802A in FIG. 9) may cause the motion detector 414 to disregard motion that occurs within the region of the environment 417 corresponding to that zone. In the example of FIG. 9, the motion detector 414 does not detect motion within the environment corresponding to zone 802A.

Figure 10:
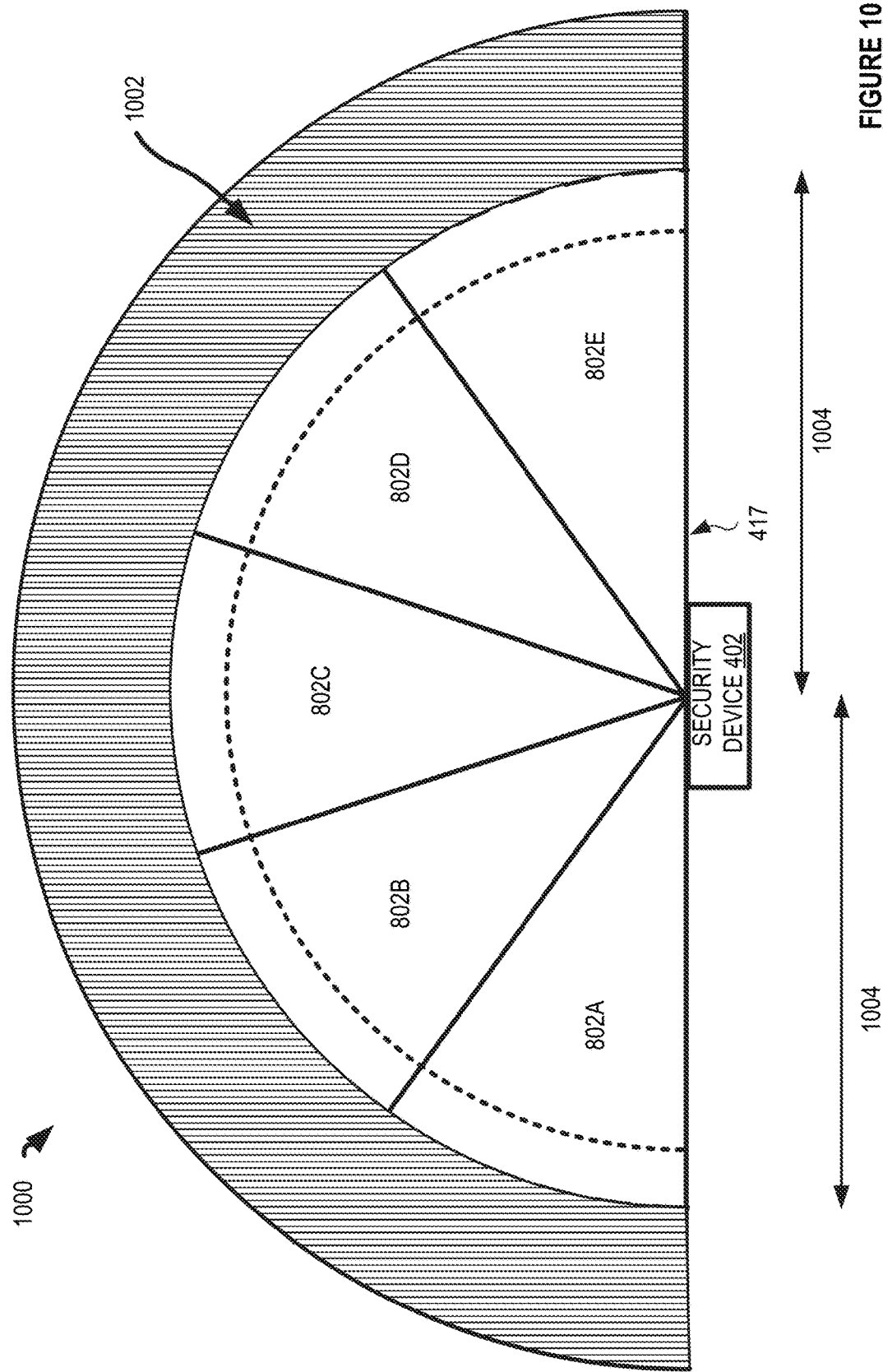
FIG. 10 is a functional block diagram illustrating a change in size of a zone of the detection region of FIG. 8.

Embodiments of the present disclosure may also allow for the sensitivity of the motion detector 414 to be adjusted, thereby effectively increasing and decreasing the sizes of the detection zones 802A-802E. For example, FIG. 10 shows a detection region 1000 that is generally identical to the detection region 800, except that the sensitivity of the motion detector 814 is reduced, thereby reducing the detection range of the zones 802 such that the motion detector 414 may not detect motion beyond a maximum distance 1004 (e.g., 20 feet or any other distance) from the security device 402. Thus, the movement of a person (or animal, or object, etc.) within an exempt area 1002, at or beyond the maximum distance 1004, may be not be detected (or may be ignored if detected) by the motion detector 414.

The locations of the zones 802 and the operational range of the motion detector 414 are not visible within the environment 417. That is, the user can only see the zones 802 within the graphical user interface (GUI) on the display of the client device 404 (as described below), but the GUI does not indicate where physical features of the environment 417 (e.g., the street 502, the tree 512, etc.) are located relative to the zones 802. It can thus be challenging to correctly configure parameters of the motion detector 414 without significant trial and error, which reduces the quality of the user experience, and increases the likelihood of the user calling customer support. The present embodiments solve this problem by enabling auto-configuration of motion detector parameters, as described below.

Returning now to FIG. 4, the server 406 may include an artificial intelligence (AI) learning module 422. The AI learning module 422 may contain, or be configured according to, software/firmware instructions that are executable by a processor to perform the functionality of the server 406 (or the client device 404, if the AI learning module 422 is located thereon) as described herein. The AI learning module 422 may allow for the sensitivity of the motion detector 414 and/or the operational states of the one or more zones 802A-802E to be automatically configured by the system 400 so that motion in areas not of interest to the user 418 may be ignored, thereby reducing nuisance alerts received by the user 418.

Specifically, in embodiments, the AI learning module 422 may be configured to: (a) process an image captured by the camera 412 to isolate therein each of a person and one or more objects; (b) approximate at least one relationship between the camera 412 and the one or more objects in the image (e.g., approximate the distance between the camera 412 and an object in the image, approximate the angular relationship of the camera 412 and an object in the image, etc.) based at least in part on a predefined distance between the camera and the person; (c) account for any errors in the initial approximations based on user input so that the accuracy of subsequent approximations by the AI learning module 422 is enhanced; (d) generate a hardware recommendation for the user 418 to resolve any problems associated with motion detection likely to be encountered by the user 418; and (e) use the approximations, together with the user corrections, to configure the sensitivity of the motion detector 414 and the operational state of each of the motion zones of the motion detector 414 so that motion in areas not of interest to the user 418 may be ignored by the motion detector 414.

More specifically, in embodiments, the AI learning module 422 may include an image processor 424, an attribute estimator 426, an error corrector 428, a recommendation generator 430, and a configurator 432. The image processor 424 may be configured to process an image captured by the camera 412 to determine the presence of the user 418 (or another person) and/or at least one object (e.g., a street) in the image. The attribute estimator 426 may be configured to use a known distance between the user 418 and the camera 412 to approximate a distance between the camera 412 and the at least one object in the image. In embodiments, the attribute estimator 426 may also be configured to approximate an angular relationship between the camera 412 and the object, to estimate a horizontal and/or vertical angle from the security device 402 to the object, and/or a distance above the ground surface within the environment 417, etc.

The error corrector 428 may be configured to allow the AI learning module 422 to correct any errors in its initial approximations based on user input to enhance the accuracy of subsequent approximations. The recommendation generator 430 may be configured to generate a recommendation to the user 418 so that any issues with motion detection (e.g., motion missed by the motion detector 414 because of the install height of the security device 402) may be resolved. The configurator 432 may be adapted to use the results of the modules 426-430 to automatically configure the operational state of the motion detection zones 802A-802E (e.g., to turn them on or off) and the overall sensitivity (e.g., range) of the motion detector 414 so that motion within the environment 417 in areas not of interest to the user 418 may be disregarded.

During setup of the security device 402, or at other times, such as when the user 418 receives unhelpful alerts about motion (of persons, things, etc.) occurring in areas that are not of interest to the user 418 (e.g., a street, a parking lot, etc.), the user 418 may use the client application 420 to invoke the AI learning module 422 to configure the motion detection zones 802A-802E and/or the sensitivity of the motion detector 414. The user 418 may use the input/output device 423 of the client device 404 to interact with a graphical user interface (GUI) 1100 (see e.g., FIGS. 11-20) of the client application 420 associated with the security device 402. In an embodiment, the GUI 1100 may have a plurality of pages and/or screens that display information to the user 418 and/or get information from the user 418. As discussed below, the GUI 1100 (e.g., the screens thereof) may allow the user 418 to interact with the AI learning module 422 so that the operational state of each of the motion detection zones 802A-802E and/or the sensitivity of the motion detector 414 may be desirably configured.

Figure 11:
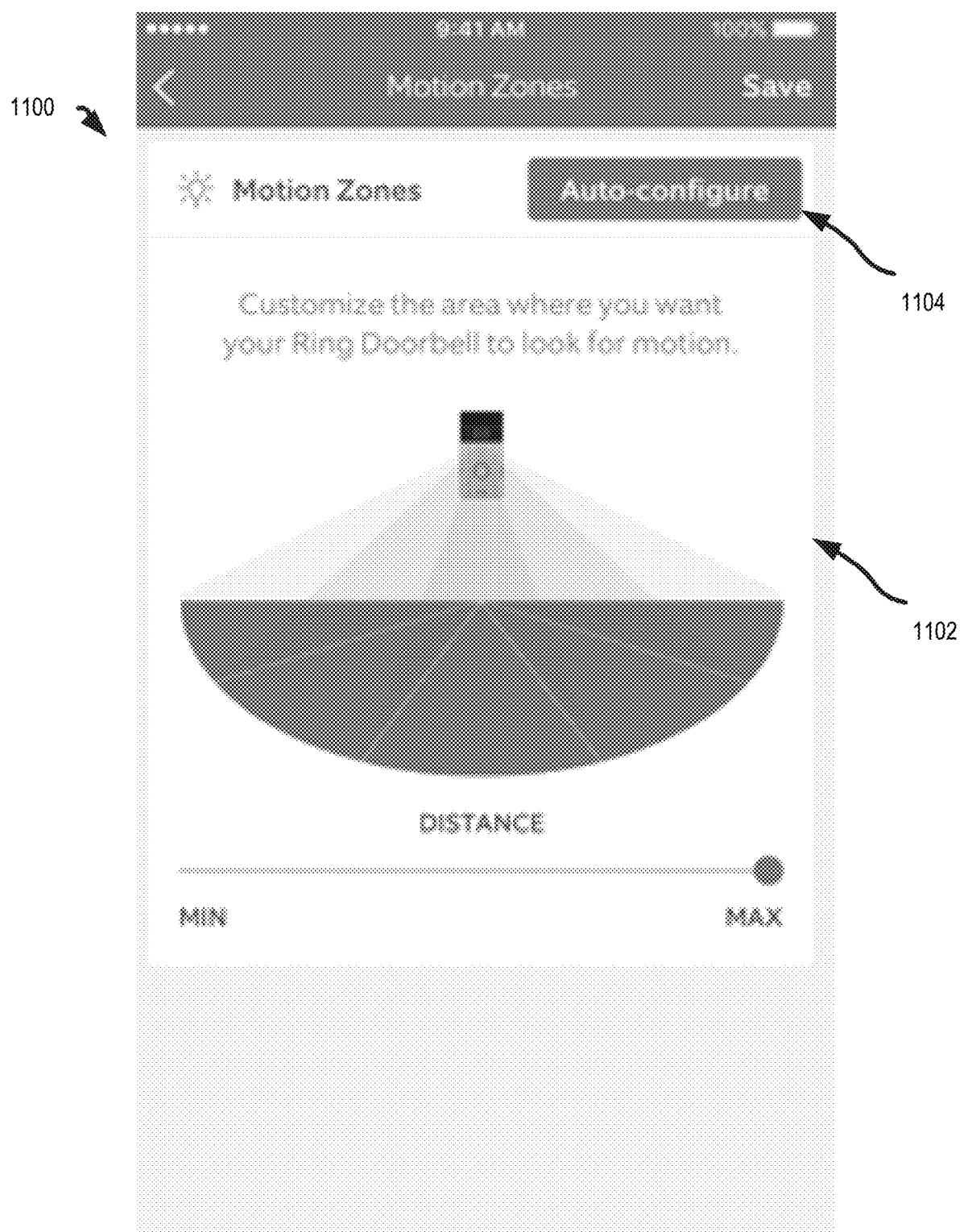
FIGS. 11-13 are screenshots of example graphical user interfaces of a client device of the security system of FIG. 4.

FIG. 11 shows an example screen 1102 of the GUI 1100 that includes an "auto-configure" or other input button 1104. By selecting the auto-configure input button 1104, the user 418 may initiate an automatic motion detector configuration process (e.g., see method 2200 of FIG. 22). Once the user 418 selects (e.g., taps or clicks on) the auto-configure input button 1104, the camera 412 may be controlled to capture and transmit an image to the AI learning module 422 and/or the client device 404 so that the user 418 may review the image using the input/output device 423.

Figure 12:
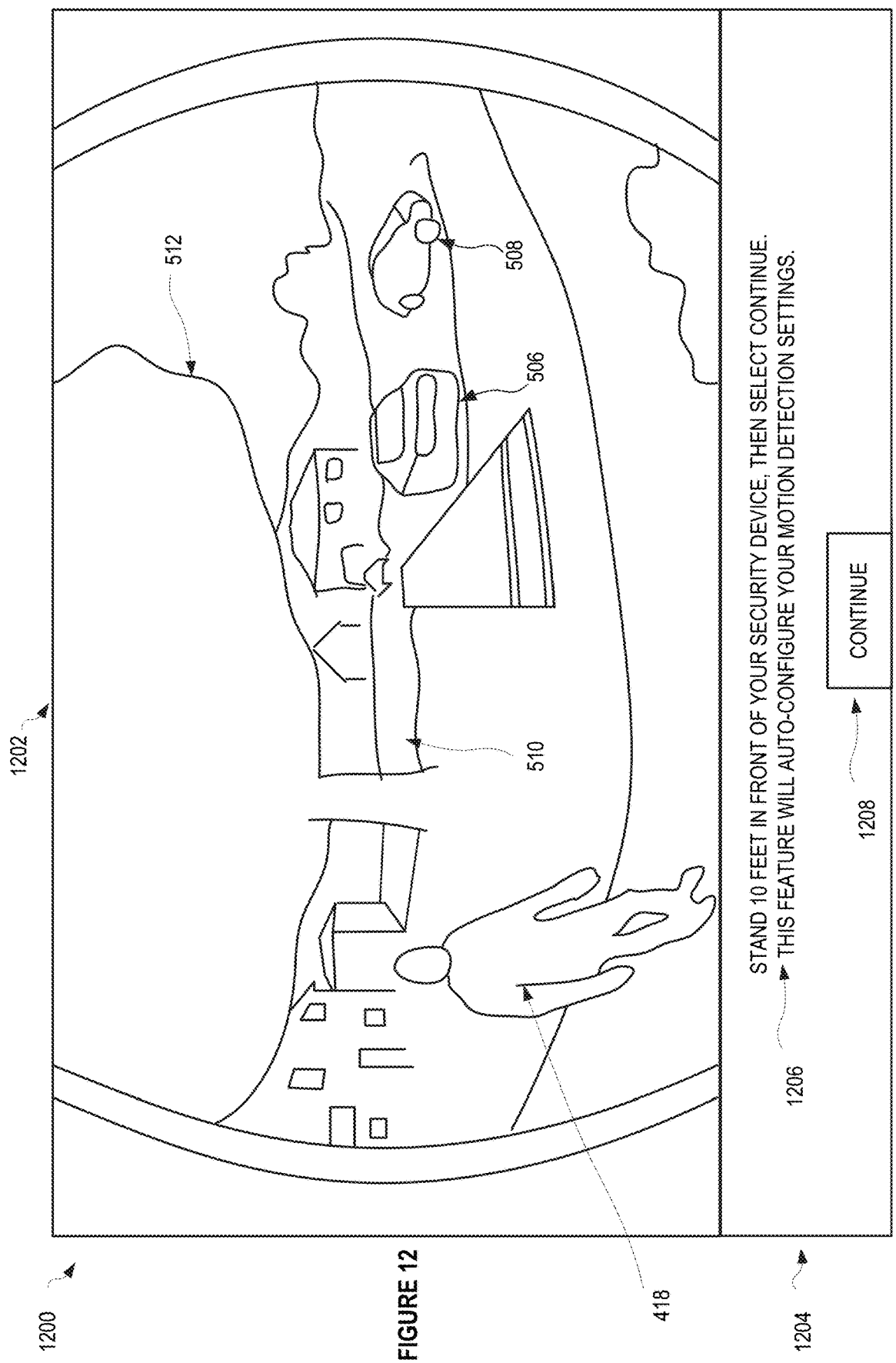

FIG. 12 shows an example screen 1200 of the GUI 1100 that includes an image 1202 captured by the camera 412 and an instruction area 1204. For illustrative purposes, the image 1202 represents the scenario 500 in FIG. 5, and includes the street 502, the vehicles 506 and 508, the tree 512, etc. A textual instruction 1206 within the instruction area 1204 instructs the user 418 to stand ten feet (or another predefined distance, e.g., five feet, fifteen feet, etc.) in front of the security device 402. In some embodiments, additionally or alternatively, the instruction 1206 may be audibly output (e.g., by a speaker of the security device 402). In certain embodiments, the instruction area 1204 may also include an input button 1208 that the user 418 may select (e.g., tap or click on) once the user 418 is standing ten feet in front of the security device 402. In other embodiments, the AI learning module 422 and/or the security device 402 may detect when the user 418 is compliant with the instruction 1206.

Figure 13:
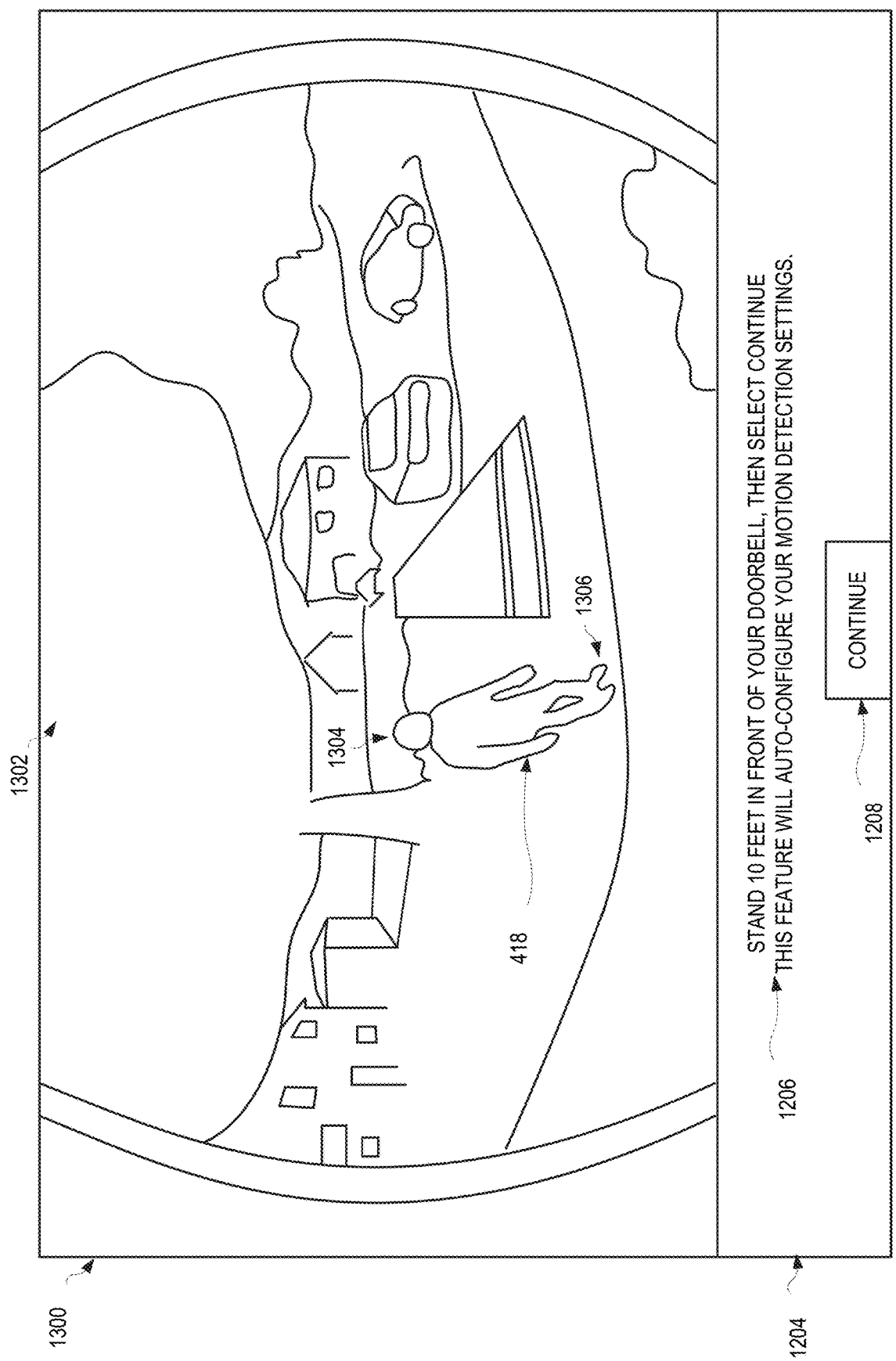

FIG. 13 shows an example screen 1300 of the GUI 1100 that includes an image 1302 and the instruction area 1204. The screen 1300 is generally identical to the screen 1200, except that the user 418 in the image 1302 is standing a predefined distance (e.g., ten feet) away from the security device 402 as instructed. The user 418 may select (or otherwise interact with) the input button 1208 displayed on the input/output device 423 of the client device 404 to indicate his or her compliance with the instruction 1206.

The image processor 424 may process the image 1302 to isolate the user 418 in the image 1302. The image processor 424 may further process the image 1302 to isolate one or more exempt areas (e.g., regions that are to be excluded from motion detection, such as the street 502). The image processing techniques used by the image processor 424 may include, e.g., edge detection, feature extraction, pattern recognition, corner determination, facial recognition (to identify the user 418, and other objects and features in the image 1302), etc., or other image processing techniques now known and/or subsequently developed. For example, the image processor 424 may process the image 1302 to detect objects and features, and then use pixel locations of edges to determine distance and angles of the detected object relative to the security device 402. The AI learning module 422 may learn from each user (e.g., user 418 and others) of areas selected to be exempt from motion detection, and, based upon these previously defined areas and corresponding images, learn to recognize areas within the environment 417 that may cause detection of movement that is not of interest to the user 418. For example, where several previous users have marked an area around a community mailbox as an area where motion should be ignored, the AI learning module 422 may identify, within captured images, similar mailboxes and automatically define the corresponding area as exempt from motion detection.

In embodiments, when the image processor 424 detects an exempt area in the image 1302, the user 418 may be prompted to use his or her finger (or a stylus or another input device) to create an overlay that defines the exempt area, and to confirm the location of the exempt area in the image 1302. The attribute estimator 426, based at least in part on the predefined distance between the user 418 in the image 1302 and the security device 402 (e.g., the camera 412 thereof), may estimate a distance between the exempt area (e.g., the street 502) and the security device 402.

In an embodiment, the attribute estimator 426 may use the "similar triangles" method to estimate pixel-distance relationships between the camera 412 and objects in the image. In some of the present embodiments, it may be estimated that, when an object distance is much larger than the focal length (f) of the lens of the camera 412, then the focal length (f) may be defined by the following equation:

$$f = \frac{\text{Height (or width) of object in image}}{\text{(Distance between object and lens} * \text{Real height (or width) of object)}}. \quad \text{(Eq. 1)}$$

Figure 13A:
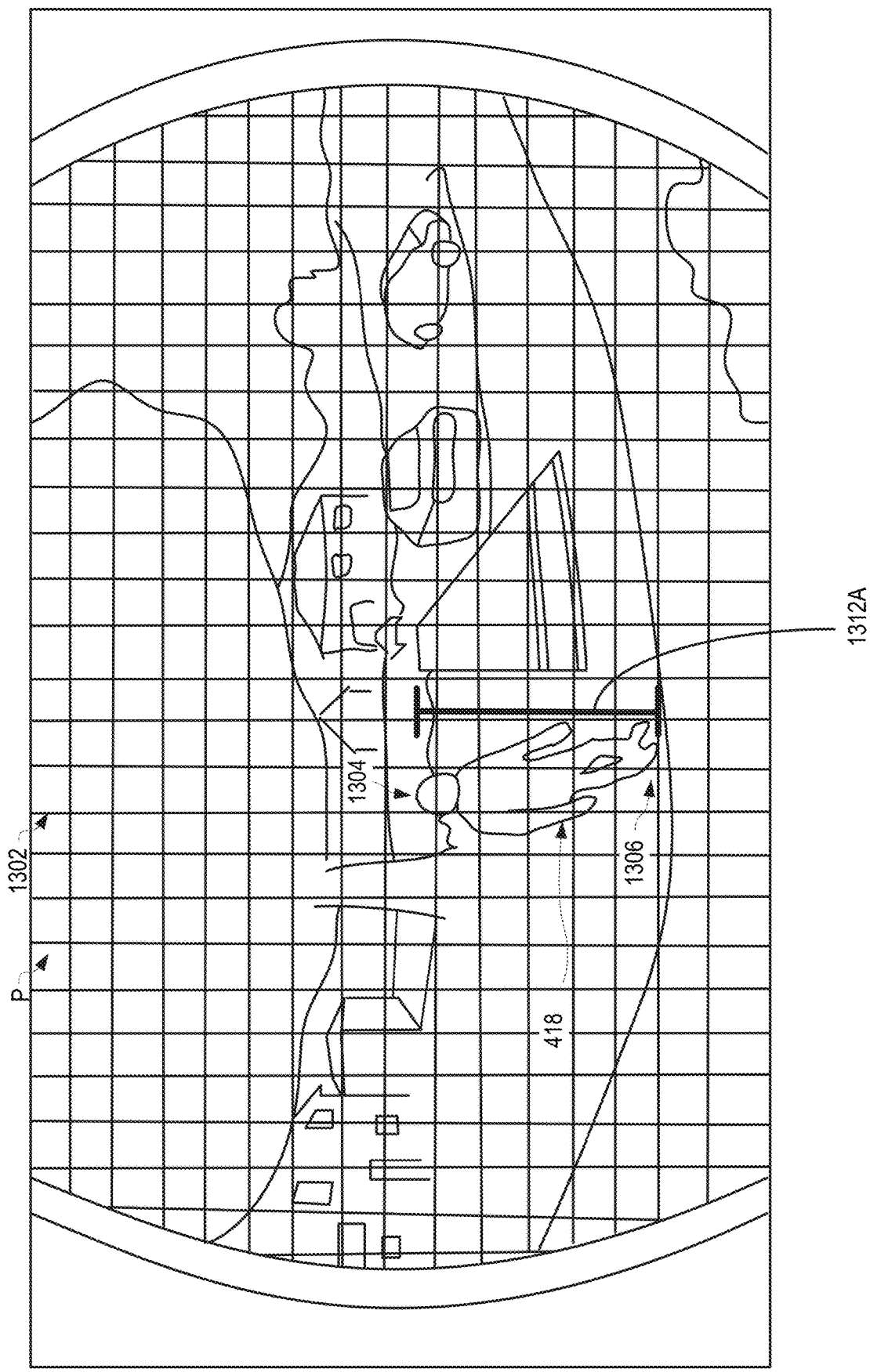
FIG. 13A is a schematic illustrating an automatic determination of an apparent height of a user of the security system of FIG. 4.

In some embodiments, the attribute estimator 426 may assume that the real height of the user 418 is 5 feet, 5 inches (e.g., the average height of an adult in the United States, or a different height). The attribute estimator 426 may also determine the apparent height of the user 418 in the image, e.g., in pixels, by computing the height of the user 418 isolated by the image processor 424. For example, as shown in FIG. 13A, the image processor 424 may determine a number 1312A of pixels P between the top of the head 1304 of the user 418 in the image 1302 and the feet 1306 (or a foot) of the user 418 in the image 1302. Based upon the known focal length f of the camera 412, the attribute estimator 426 may use Equation 1 to readily ascertain the distance between the lens of the camera 412 and any exempt areas isolated in the image by the image processor 424. Thus, the user 418 may serve as a point of reference for the attribute estimator 426 to estimate the distance between the security device 402 and one or more other objects in the image 1302.

In some embodiments, the attribute estimator 426 may also determine other attributes of the exempt areas in the image 1302. For example, in embodiments, the attribute estimator 426 may be configured to determine an angular relationship between an optical axis of a lens of the camera 412 and the exempt area in the image (e.g., may be configured to determine whether the exempt area is directly in front of the camera 412 or is situated at an angle relative to the camera 412). In one embodiment, the motion detector 414 may be aligned with (or have a predefined relationship with) the optical axis of the camera 412, and thereby the determined angles may be related to the zones 802 of the motion detector 414. In one example of operation, the attribute estimator 426 may fit, within the image 1302, a straight line to the street 506 and determine a left pixel height where an extension of the straight line intersects a left edge of the image, a right pixel height where the extension of the straight line intersects a right edge of the image, and the street angle based upon the left pixel height and the right pixel height.

In certain embodiments, where the motion detector 414 is a PIR sensor, the attribute estimator 426 may use PIR data from the motion detector 414, collected over a capture period while the security device 402 was configured to monitor the environment 417, to generate a PIR 2D or 3D model of sensed movement that may be used to identify repeated movement of objects along a particular path. For example, detected PIR data for a vehicle moving along a street would indicate as a large heat signature moving on a very consistent path through a field of view of the motion detector 414. Such movement, particularly when detected repeatedly during the capture period, may indicate the presence of a street (e.g., the street 506), and provide information of the angle of the street relative to the security device 402.

In embodiments, the attribute estimator 426 may likewise be configured to use at least the known distance between the user 418 and the camera 412 to compute the vertical distance (e.g., a mounting height of the security device 402) between the camera 412 and the ground surface on which the user 418 is standing. This distance determination may further allow the attribute estimator 426 to estimate a range (e.g., a maximum distance range) of the motion detector 414 within the environment 417. While not required, in an aspect of the present disclosure, the user 418 may stand in front of the camera 412 and hold a known object. In these embodiments, the attribute estimator 426 may use a known size of the known object to determine a distance of the known object from the camera 412 based upon a known focal length f of the camera and Equation 1. For example, the attribute estimator 426 may determine a pixel size of the known object within the image 1302 and then determine a pixel-distance relationship based upon the pixel size, the predefined distance (e.g., ten feet), and the imaging equation (e.g., Equation 1) of the camera. This technique may allow the attribute estimator 426 to estimate the distance between the camera 412 and other objects in the image with greater accuracy.

Figure 14:
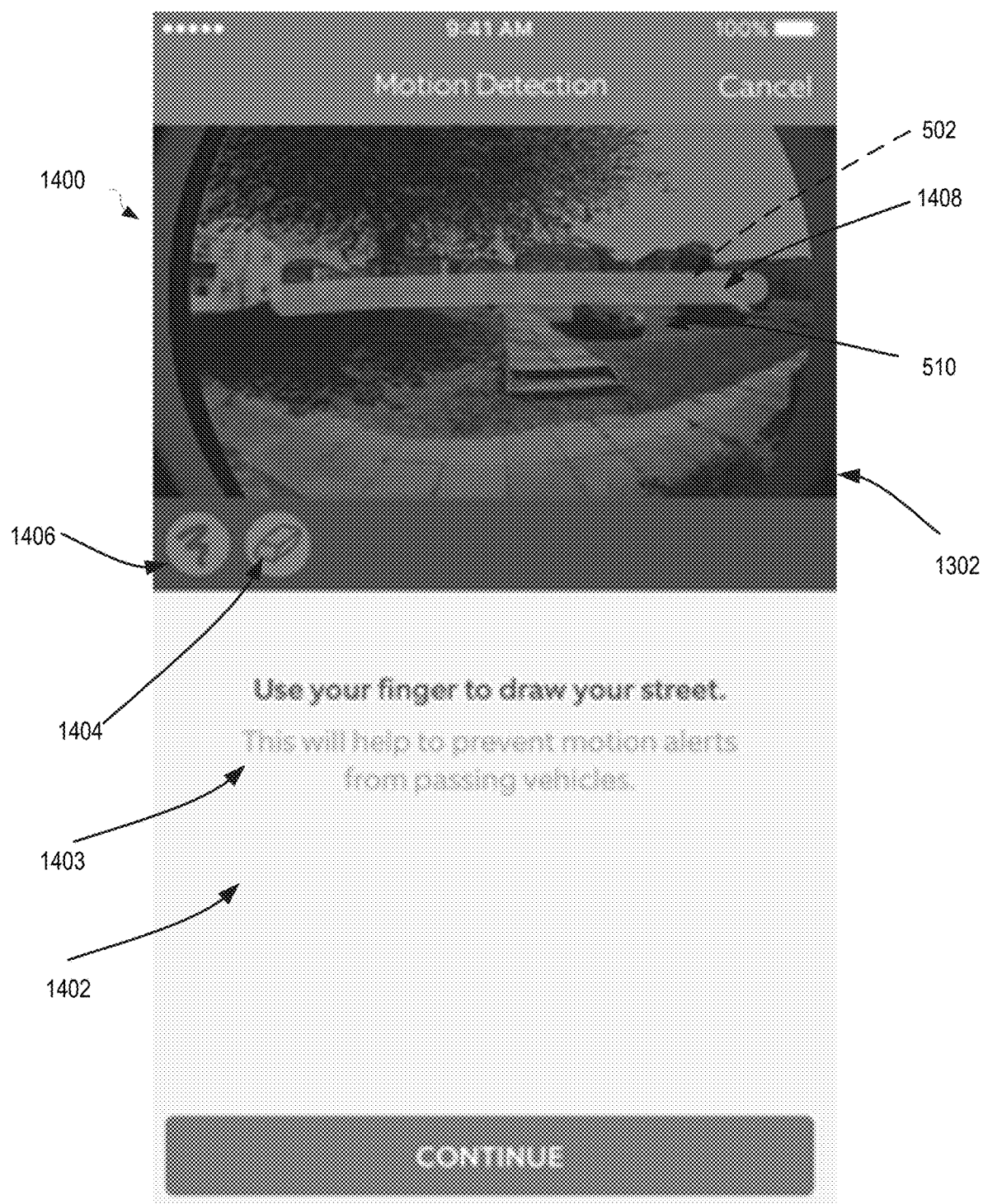
FIGS. 14-21 are screenshots of example graphical user interfaces of a client device of the security system of FIG. 4.

FIG. 14 shows an example screen 1400 of the GUI 1100 with the image 1302 and an instruction area 1402 that includes an instruction 1403 instructing the user 418 to define the exempt area in the image 1302. The screen 1400 may include tools, e.g., a pencil tool 1406, an eraser tool 1404, etc. to allow the user 418 to interactively define the exempt area on the image 1302 displayed on the input/output device 423. The user 418 may use the pencil tool 1406 to mark the exempt area in the image 1302 (e.g., the street 502 as shown in FIG. 14, or another exempt area such as a path, a parking area, a tree, a playground, etc.). In some embodiments, the exempt area may be, or may include, a source of infrared radiation, such as a heating vent, a flame, a light, etc.

As shown in FIG. 14, a marking 1408 made by the user 418 using the pencil tool 1406 to define the exempt area may be displayed on the screen 1400. Such a visible marking or overlay 1408 may allow the user 418 to ensure that the marking 1408 correctly defines the exempt area. If the marking 1408 created by the user 418 is inaccurate (e.g., does not define the street 502 correctly), the user 418 may use the eraser tool 1404 to erase the marking 1408 and use the pencil tool 1406 to recreate an overlay that more accurately defines the exempt area. As described above, these overlays 1408, together with the image 1301, may be analyzed by the AI learning module 422 to learn of exempt areas such that they may be automatically identified.

Figure 14A:
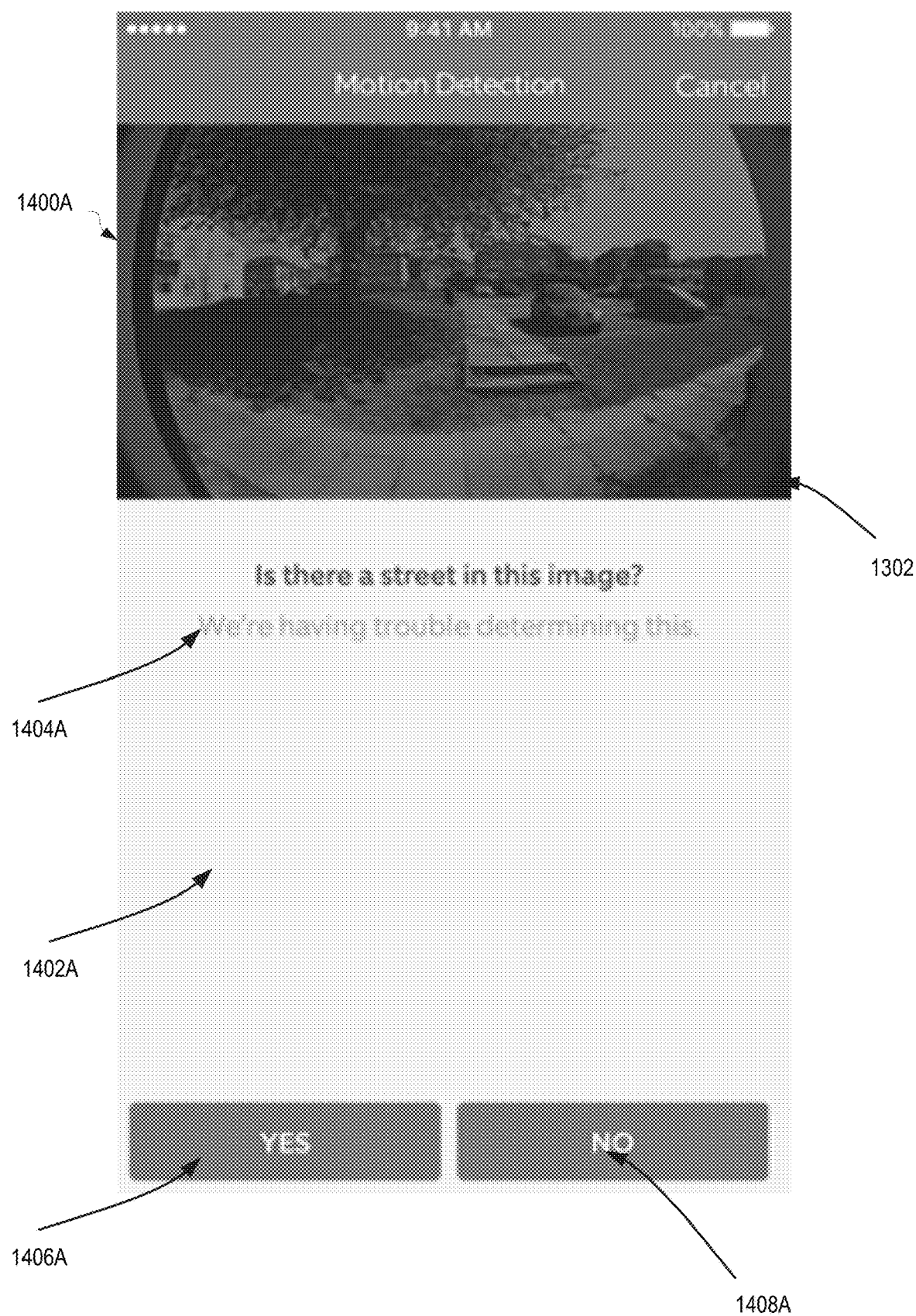

FIG. 14A shows an example screen 1400A of the GUI 1100, which, in certain cases, may be displayed for the user 418 prior to the screen 1400. More specifically, the image processor 424 may in some cases be unable to automatically identify an exempt area in the image 1302 (e.g., the image processor 424 may be unable to ascertain that there is a street 502 in the image 1302). In these cases, the screen 1400A may be displayed to ask the user 418 if there is in fact an exempt area (e.g., a street) in the image 1302. The screen 1400A may include the image 1302 and a communication area 1402A. The communication area 1402A may include a question 1404A that asks the user 418 about the existence of an exempt area in the image 1302. The user 418 may depress an input button 1406A to indicate that the image 1302 does indeed include an exempt area, in which case the screen 1400 may subsequently be displayed to allow the user 418 to demarcate the exempt area. Alternatively, if the user depresses an input button 1408A to indicate that the image does not contain an exempt area, the motion configuration process may end based on the user's desire to not ignore motion within the environment 417.

Figure 15:
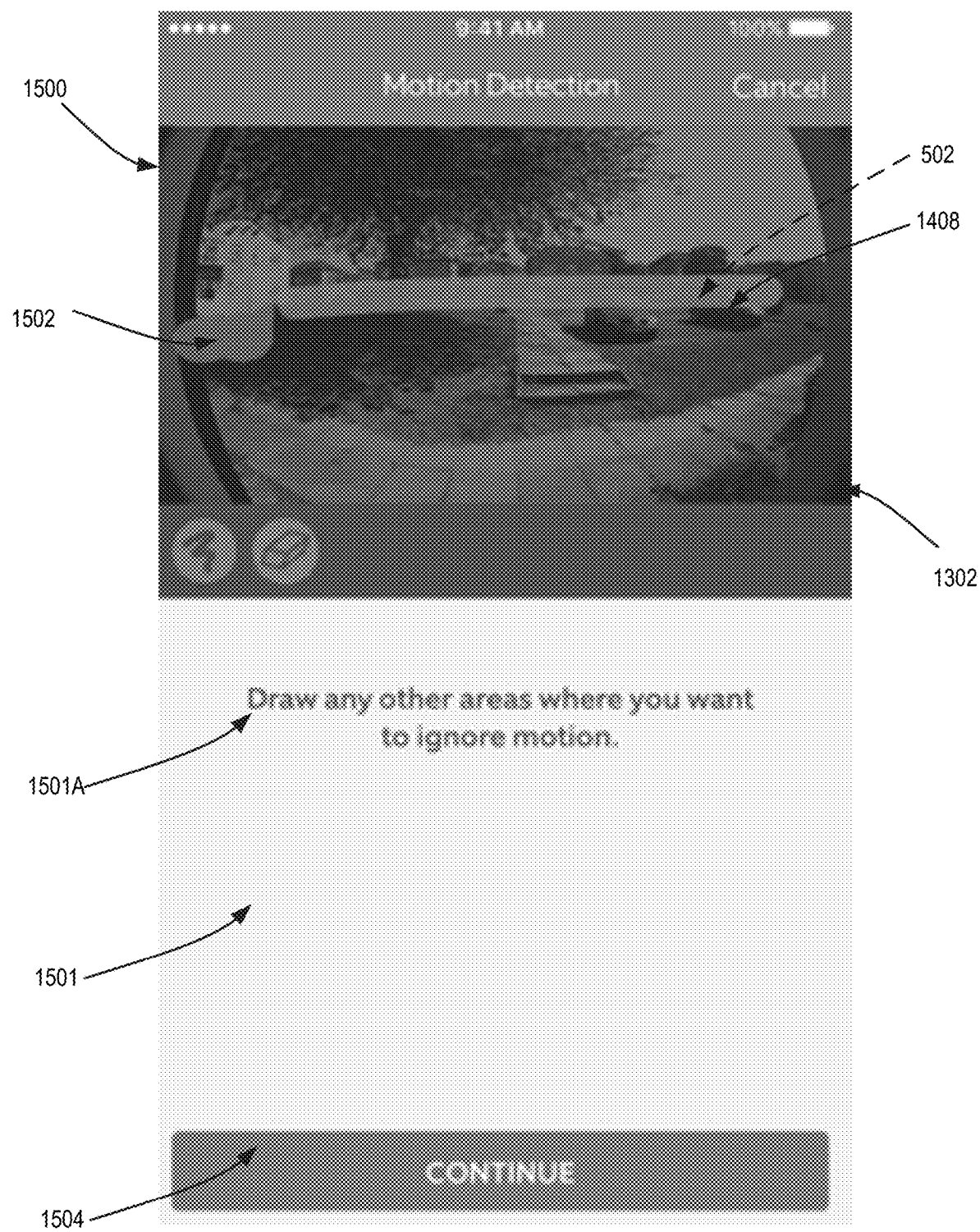

Once the user 418 has defined an exempt area (e.g., the street 502) using the screen 1400, the user 418 may be allowed to use the tools (e.g., the pencil tool 1406) to indicate additional exempt areas. FIG. 15 shows an example screen 1500 of the GUI 1100 that illustrates this feature in additional detail. The screen 1500 may have an instruction area 1501 comprising an instruction 1501A instructing the user to indicate additional areas in which motion is to be ignored. The user may use the screen 1500 and the tools (e.g., the pencil tool 1406) to indicate additional exempt areas, if needed. For example, as shown in FIG. 15, the user 418 may use the pencil tool 1406 to define an exempt area 1502 (e.g., an entrance to a different building or another area not of interest to the user 418). For example, where the user 418 sees an area within the image 1302 that is known to have activity that may trigger the motion detector 414 but where that motion is not of interest to the user 418, the user 418 may use the pencil tool 1406 to mark that area as exempt for motion detection. Once the user 418 has defined the exempt areas (e.g., the street 502, the exempt area 1502) in this fashion, the user 418 may select an input button 1504 to continue the configuration process.

Figure 16:
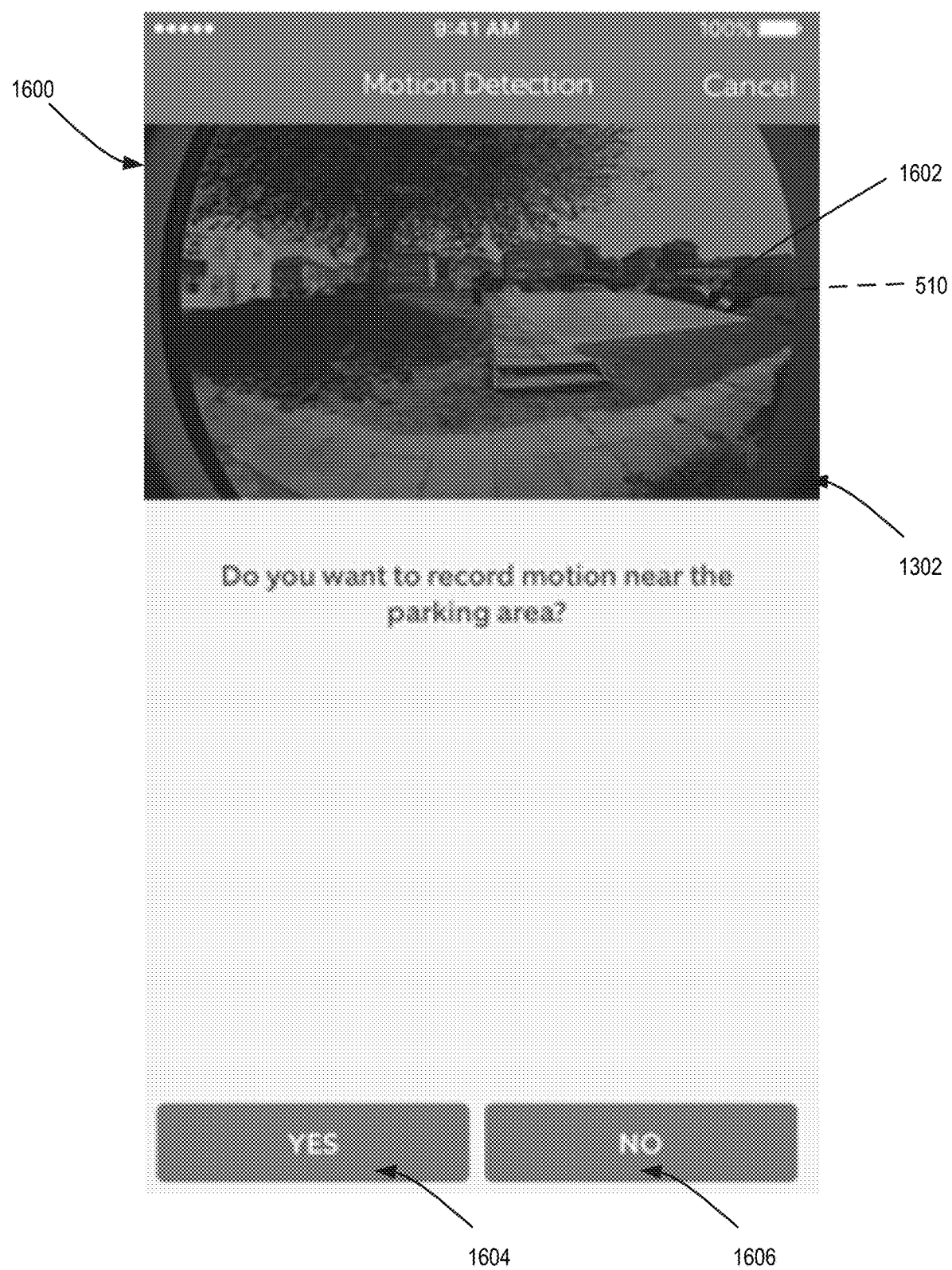

FIG. 16 shows an example screen 1600 of the GUI 1100. In embodiments, the image processor 424 may process the image 1302 to determine the presence of one or more obstruction regions between an exempt area (e.g., the street 502) and the security device 402. For example, in the illustrated example, the image processor 424 may process the image 1302 to determine that a parking lot (e.g., the parking lot 510, see FIGS. 5 and 16) is located between the security device 402 and the street 502. If such an obstruction region 1602 is found, it may be highlighted for the user 418 as shown in FIG. 16, and the user 418 may be asked whether he or she wants motion in the obstruction region 1602 to be detected. The user 418 may select an input button 1604 to indicate that motion in the obstruction region is to be considered by the security device 402, e.g., by the motion detector 414 thereof. Alternatively, the user 418 may select an input button 1606 to indicate that any motion that occurs within the obstruction region is to be ignored.

Once the exempt areas (e.g., the street 502, also referred to herein as a primary exempt area, and the exempt area 1502, also referred to herein as a secondary exempt area) and the obstruction regions (e.g., the obstruction region 1602) have been identified in the image 1302, the attribute estimator 426 may use known techniques to estimate various attributes of objects in the image 1302. For example, in an embodiment, the attribute estimator 426 may estimate the distance between the camera 412 and the primary exempt area (e.g., the street 502), estimate the vertical distance between the camera 412 and the ground surface, estimate whether the primary exempt area (e.g., the street 502) directly faces the camera 412 or is located at an angle relative to the security device 402, etc. These estimations may then be displayed (see FIG. 17) to the user 418, and the user 418 may be allowed to correct any errors in the estimates made by the AI learning module 422. If the user 418 does correct one or more of the estimated values, such as changing the distance between the camera 412 and the street 502, for example, the error corrector 428 may take the user input into account to enhance the accuracy of subsequent estimations by the attribute estimator 426. For example, where the user 418 subsequently (e.g., a day after the initial motion configuration, a year after the initial motion configuration, etc.) indicates that the motion zones need to be reconfigured to introduce another exempt area, the attribute estimator 426 may query the error corrector 428 prior to the estimation of the attributes to ensure that the estimations take into account the user input.

Figure 17:
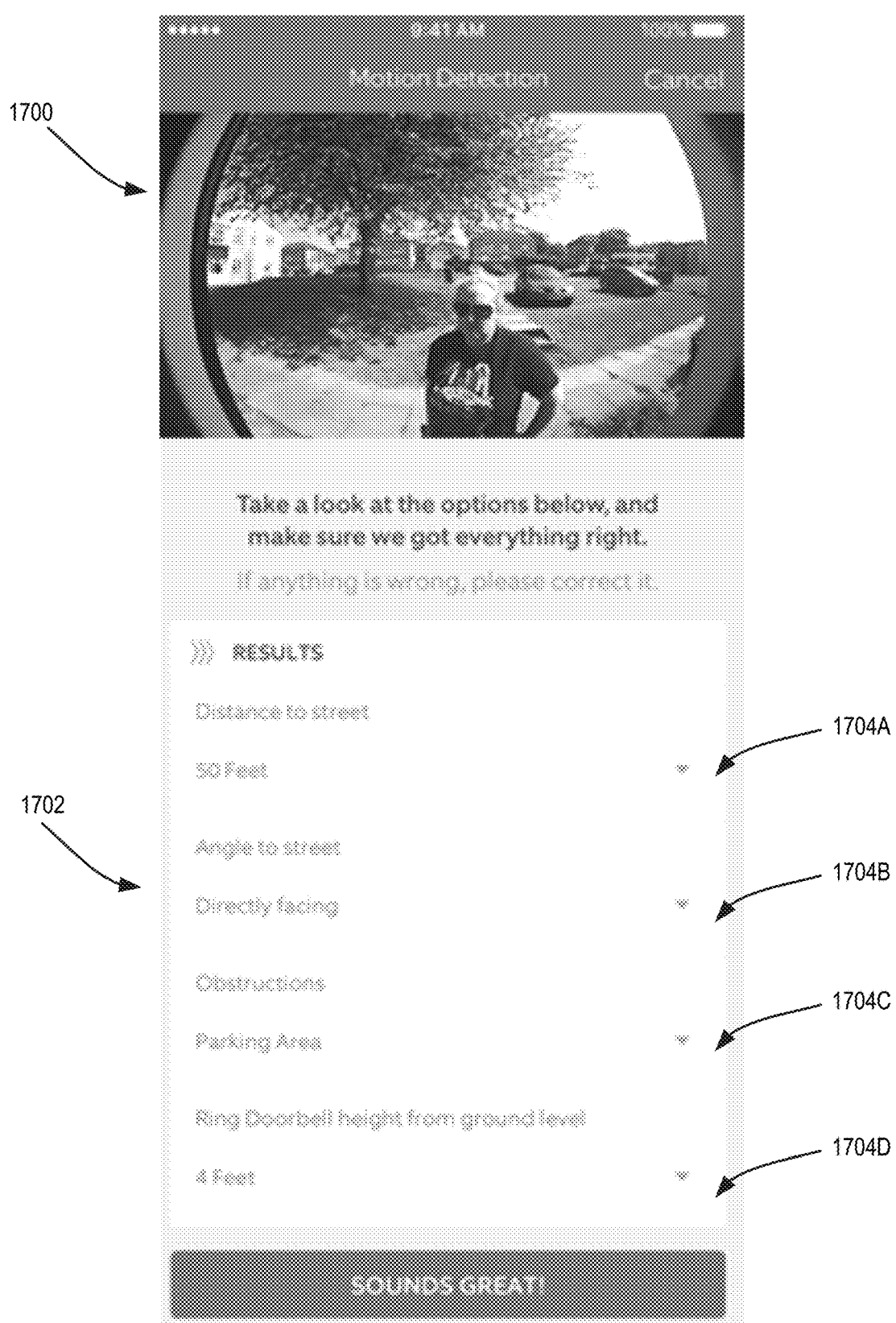
Figure 18:
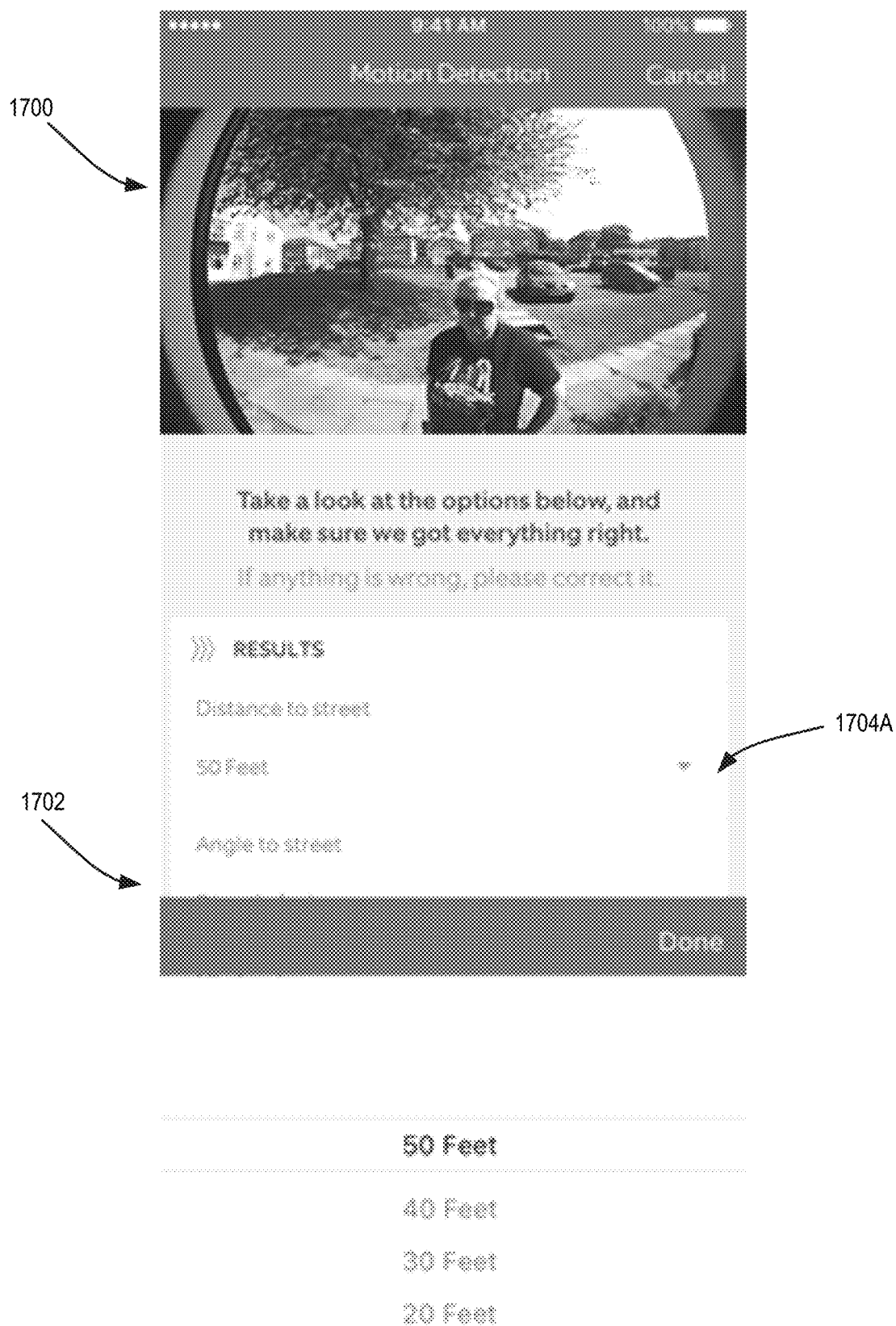

FIG. 17 shows an example screen 1700 of the GUI 1100. The screen 1700 may have a results area 1702 that lists the results of the configuration process. For example, in the illustrated example, the results area 1702 includes: (a) the distance between the camera 412 and the primary exempt area (e.g., the street) 502; (b) an angular relationship between the camera 412 and the street 502 (e.g., the direction of the street 502 from the camera 412, such as whether the camera 412 directly faces the street 502 and whether the street 502 is located at an angle from the camera 412); (c) any obstruction regions 1602 in which motion is to be ignored; and (d) a vertical distance between the security device 402 and the ground surface. The results in the results area 1702 are merely examples, and in alternative embodiments additional results (e.g., a distance between the camera 412 and the obstruction region) or fewer results may be computed and/or displayed.

The user 418 may be allowed to correct any of the results, using a dropdown list 1704A-1704D associated with each of the results, for example. As shown in an example of FIG. 18, the user 418 may use the dropdown list 1704A to indicate that the distance between the camera 412 and the street 502 computed by the AI learning module 422 is inaccurate. For example, if the AI learning module 422 indicates in the results area 1702 that the distance between the camera 412 and the street 502 is fifty feet, the user 418 may use the dropdown list 1704A to indicate that the distance between the camera 412 and the street 502 is actually forty feet, or another distance. If the user 418 indicates that one or more of the results, as determined by the AI learning module 422, are inaccurate, the error corrector 428 may cause the attribute estimator 426 to take account of such user corrections in subsequent estimations. In this way, the accuracy of the estimations made by the AI learning module 422 may be enhanced over time. In embodiments, the AI learning module 422 operates within the server 406 to configure the motion detectors 414 of many different security devices, such that the AI learning module 422 may learn from many different examples and environments.

In embodiments, where the AI learning module 422 is unable to estimate the vertical distance between the security device 402 and the ground surface, the results area 1702 may simply display a dropdown list containing a default vertical distance between the security device 402 and the ground surface (e.g., four feet). The user 418 may then use the dropdown list to correct the vertical distance, if required.

Once the user 418 has made any required corrections, the recommendation generator 430 may evaluate the configuration results, including the user corrections, to generate a recommendation for the user 418 so that motion detection by the motion detector 414 may be suitably configured for the environment 417. The recommendation generator 430 may, for example, identify a problem associated with the particular security device 402 (e.g., identify a problem in the setup thereof) and propose a solution to this problem.

Figure 19:
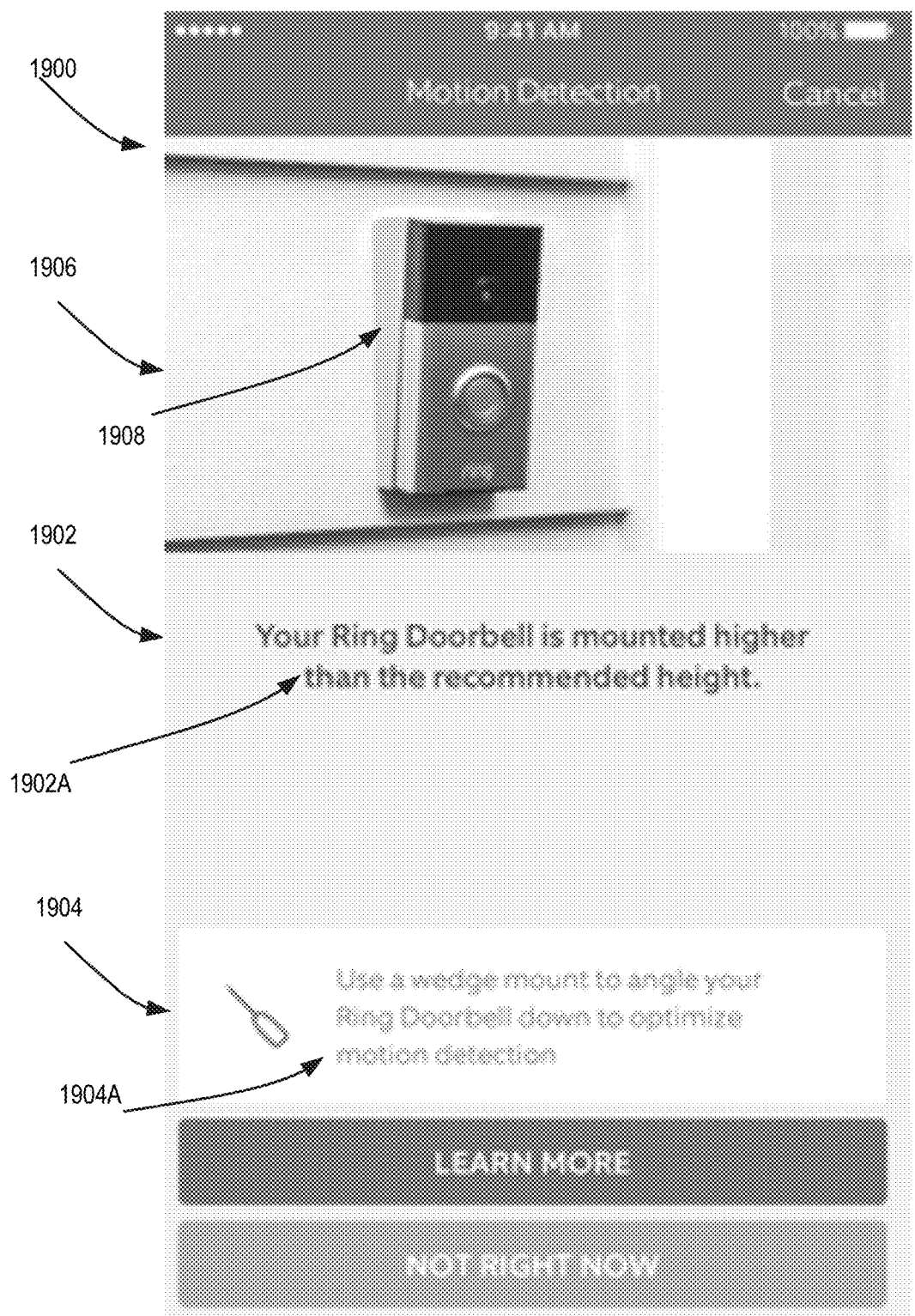

FIG. 19 shows an example screen 1900 of the GUI 1100 that may be used by the recommendation generator 430 to generate a recommendation for the user 418. The screen 1900 may have a problem identification area 1902 for identifying a perceived problem 1902A and a recommendation area 1904 for setting forth a recommendation 1904A of the recommendation generator 430 to resolve the perceived problem 1902A. In embodiments, the screen 1900 may also include an illustrative area 1906 that visually illustrates how the recommendation 1904A may be implemented. For example, where the recommendation generator 430 evaluates the configuration results and determines that motion in certain areas is likely to be undesirably overlooked by the motion detector 414 because the security device 402 is mounted too high, the recommendation generator may recommend that the user 418 use a wedge 1908 for mounting the security device 402 so that the security device 402 (e.g., the motion detector 414 and/or the camera 412 thereof) may be oriented downward to compensate for being mounted too high (or where the security device 402 is positioned at the top of steps, for example). The recommendation generator 430 may likewise recommend that the user 418 increase the distance between the security device 402 and the ground surface, change the installation angle thereof, etc. For example, where the security device 402 faces more toward the exempt area than toward the area of interest to the user 418, the recommendation generator 430 may recommend that the user 418 use a different type of wedge with the security device 402 to pivot the direction that the security device 402 faces about a vertical axis.

The configurator 432 uses the configuration results to generate parameters 415 that configure the motion detection zones 802A-802E and sensitivity of the motion detector 414. The configurator 432 may adjust sensitivity of the motion detector 414 based upon the maximum range of the motion detector 414 and the distance to the street 506 from the security device, reducing the sensitivity such that the street 506 is not within range of the motion detector 414, for example. The configurator 432 may set the operational status for each zone 802 based upon the distance and direction of the one or more exempt areas from the security device 401, for example. The configurator 432 may then transmit the parameters 415 to the security device 402 so that motion detection by the motion detector 414 is suitably configured. The parameters 415 may indicate whether the operational status of one or more of the motion detection zones 802A-802E is to be altered and/or whether the sensitivity of the motion detection zones 802A-802E is to be changed so that the motion detector 414 is configured to ignore motion in area(s) not of interest to the user 418. For example, if all (or in some cases, a majority of) the regions corresponding to a zone (e.g., zone 802A) includes one or more exempt areas (e.g., the street 502, the exempt area 1502, etc.) and/or the obstruction region 1602 in which motion is to be ignored, the configurator 432 may change the operational state of that particular zone 802 (e.g., turn the zone off) so that motion in that zone 802 is ignored. Additionally, if motion in a proximal portion of one or more zones (e.g., a portion of zones 802 close to the motion detector 414) is to be detected, but motion at distal portions of the zones 802 (e.g., a portion of that zone farther away from the motion detector 414) is to be ignored, the configurator 432 may reduce the sensitivity of the motion detector 414 to reduce the sensing range thereof so that motion is detected only in the areas of the zones 802 that are proximate the motion detector 414. FIG. 10 illustrating the sensitivity setting of the motion detector 414 is merely one example, and the sensitivity of the motion detector 414 may be increased or decreased to decrease or increase, respectively, the desired size of the exempt area 1002.

Figure 20:
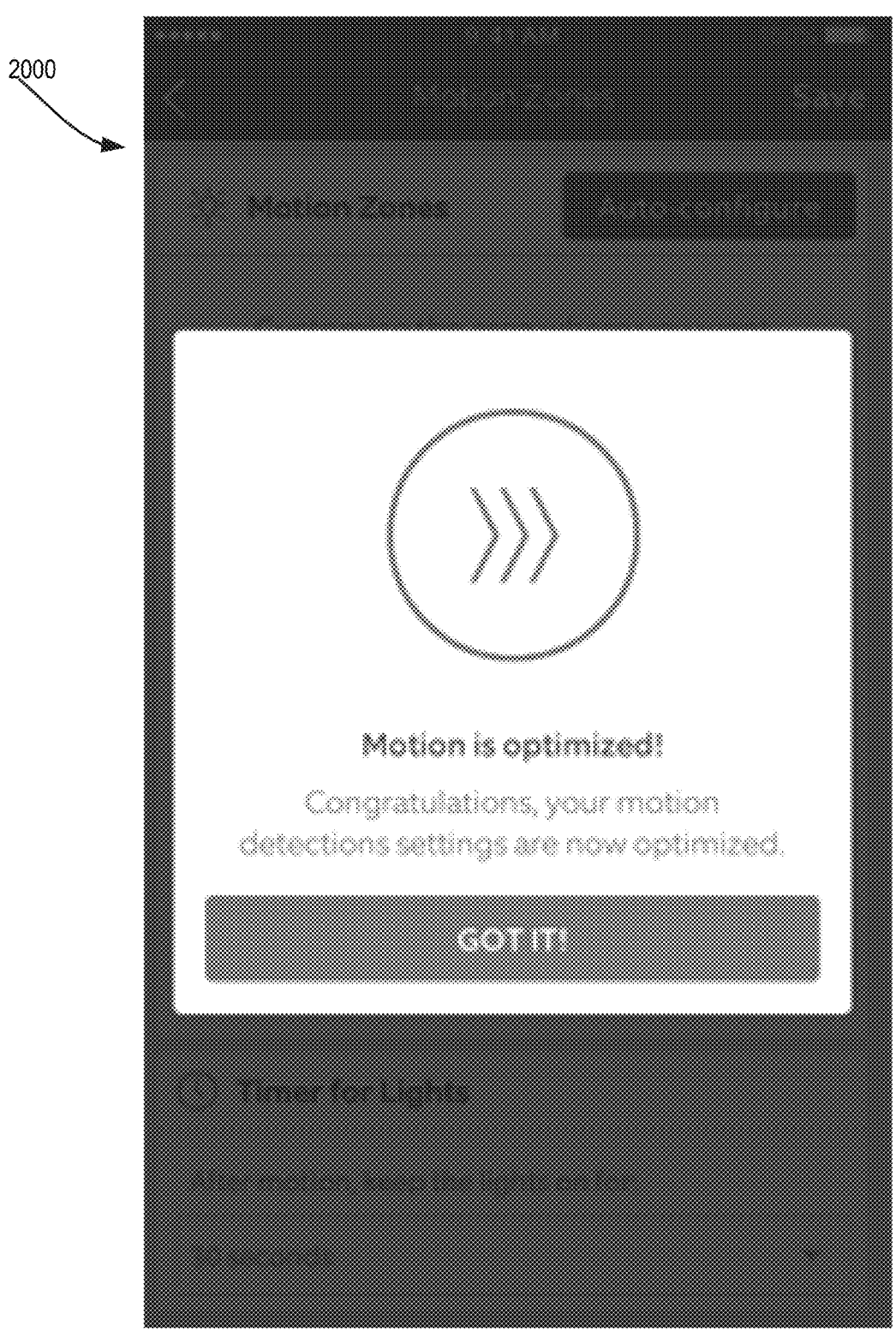
Figure 21:
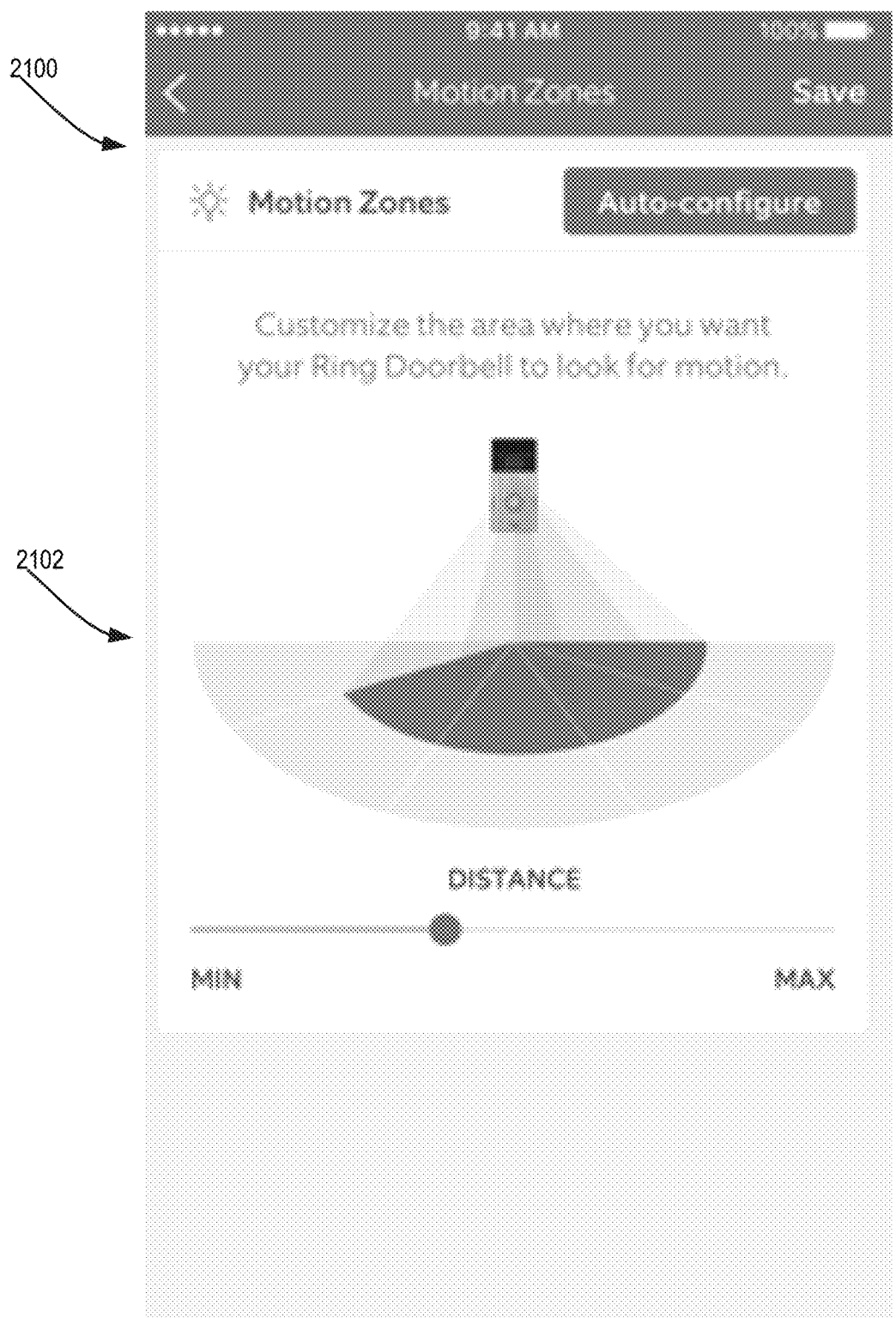

Once the configurator 432 generates the parameters 415 and configures the operational state of the motion detection zones 802A-802E and/or the sensitivity of the motion detector 414, a screen 2000 of the GUI 1100 may be displayed, as shown in the example of FIG. 20, to inform the user 418 of the successful configuration. In embodiments, a graphical illustration may be displayed to visually convey to the user 418 the current motion zone settings. For example, as shown in the example of FIG. 21, a screen 2100 containing a graphical illustration 2102 may be displayed to visually convey the settings, corresponding to the generated parameters 415, for the zones 802 and the sensitivity of the motion detector 414 to the user 418, and may also allow further manual adjustment of these settings interactively by the user 418. The example graphical illustration 2102 indicates that one zone is turned off and that the sensitivity has been reduced. In this way, the AI learning module 422 may configure the operational state and sensitivity of each of the zones 802 of the motion detector 414 so that motion in areas not of interest to the user 418 may be ignored by the motion detector 414.

Figure 22:
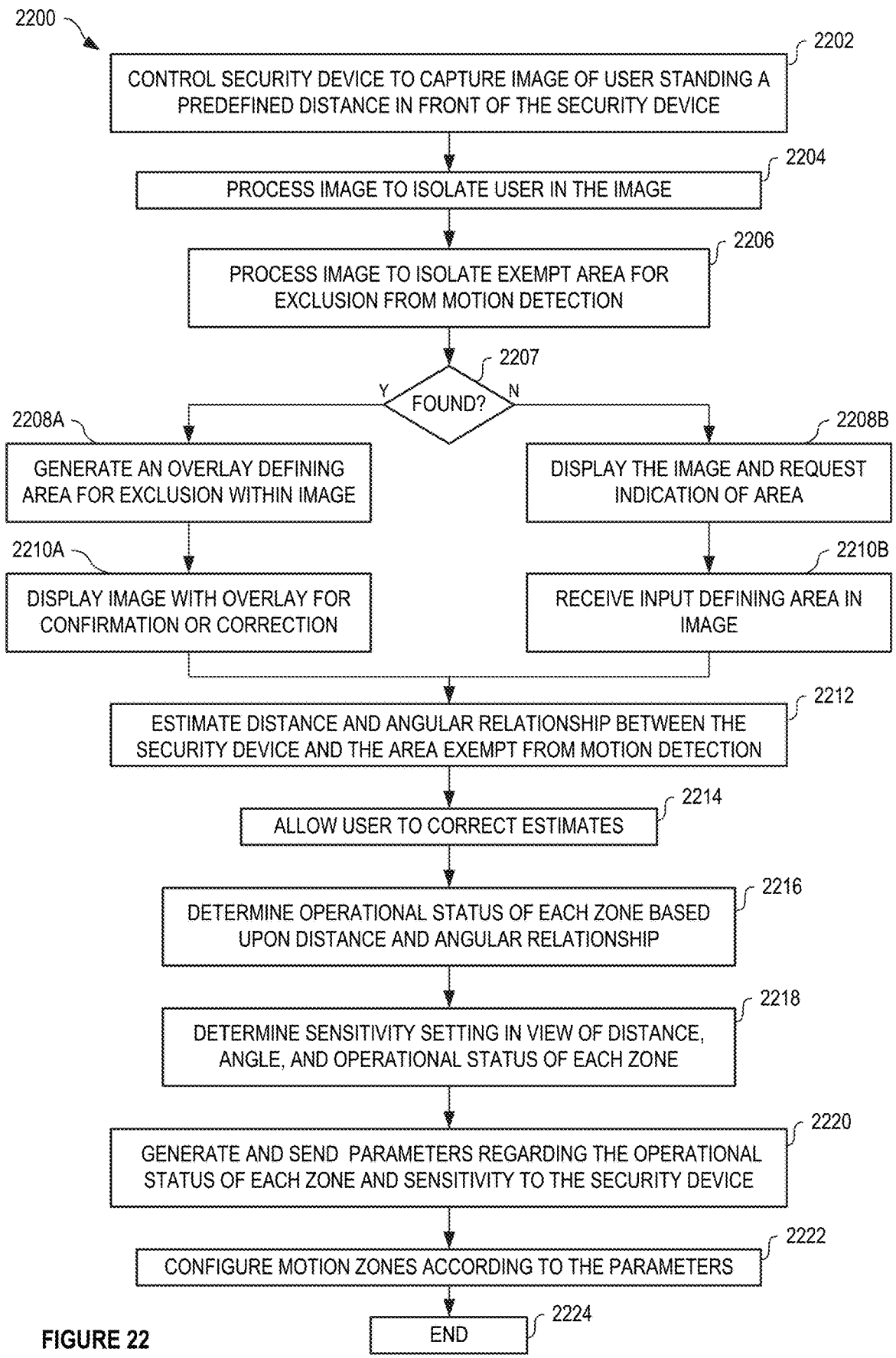
FIG. 22 is a flowchart illustrating a process of using the security system of FIG. 4 to configure zones of a motion detector.

FIG. 22 shows an example method 2200 for automatically configuring the motion detector 414 of the security device 402 of FIG. 4. The method 2200 may be, for example, implemented, at least in part, within the AI learning module 422 and the client application 420. At block 2202, the user 418 may use the input/output device 423 (FIG. 4) and the GUI 1100 to control the security device 402 to capture the image 1302 of the user 418 standing a predefined distance (e.g., ten feet or another distance) in front of the security device 402 (see FIGS. 12-13). In another example of block 2202, the AI learning module 422 controls the security device 402 to capture the image 1302 of the user 418 standing a predefined distance in front of the security device 402 in response to receiving an indication that the user 418 has complied with instructions to stand in front of the security device 402. At block 2204, the image processor 424 of the AI learning module 422 may process the image 1302 to isolate the user 418 in the image 1302. At block 2206, the image processor 424 may process the image 1302 to isolate at least one area (e.g., the street 502) that is to be exempted from motion detection.

Block 2207 is a decision. At block 2207, the AI learning module 422 may determine whether the image processor 424 identified an exempt area (e.g., the street 502) in the image 1302. If so, in an embodiment, an overlay (e.g., overlay 1408, FIG. 14) defining the exempt area may be generated in the image 1302 at block 2208A. At block 2208B, the user 418 may use tools (e.g., the pencil tool 1406, the eraser tool 1404, etc.) to correct the overlay if needed.

Alternately, if at block 2207 the AI learning module 422 determines that the image processor 424 was unable to identify an exempt area within the image 1302, the image 1302 may be displayed for the user 418 at block 2208B and the user 418 may be requested to define the exempt area (see FIGS. 14A-15). In one example of block 2208B, the AI learning module 422 sends the image 1302 to the client application 420 running on the client device 404, wherein the client application 420 displays the image 1302 to the user 418 and requests that the user 418 define the exempt area. At block 2210B, the input of the user 418 defining the exempt area may be received from the client application 420 running on the client device 404 by the AI learning module 422.

At block 2212, the attribute estimator 426 may estimate a distance between the security device 402 and the exempt area. The attribute estimator 426 may also determine an angular relationship between the security device 402 and the exempt area at block 2212. The results may be displayed to the user 418 and the user 418 may be allowed to correct these results at block 2214 (see FIGS. 17-18). As discussed above, the error corrector 428 may ensure that the user input is taken into account so that the accuracy of subsequent estimations is enhanced.

At block 2216, the configurator 432 may determine the operational status of each zone 802A-802E based on the distance between the exempt area and the security device 402 and the angular relationship of the exempt area from the security device 402. For example, the configurator 432 may determine that one or more motion detection zones 802A-802E are to be turned off because motion in areas associated therewith is not of interest to the user 418.

At block 2218, the configurator 432 may determine a sensitivity setting for the motion detector 414 in view of the distance and the angular relationship determined in block 2212 and the operational status of each zone determined in block 2216. For example, the configurator 432 may determine that the sensitivity of the motion detector 414 is to be reduced, thereby reducing detection range of the motion detector 414, so that motion in a distal portion of the zones 802 is ignored.

At block 2220, the configurator 432 may generate and transmit parameters 415 outlining the operational status of each zone 802A-802E and the sensitivity to the security device 402. At block 2222, the parameters 415 may be used to configure the operational status and sensitivity of each zone 802A-802E of the motion detector 414. At block 2224, the method 2200 ends.

While the disclosure above outlines that the AI learning module 422 and the security device 402 are separate devices that communicate over the network 410, in embodiments, all or part of the functionality of the AI learning module 422 may be included in the security device 402. In these embodiments, the security device 402 may include a memory that houses the AI learning module 422 and a processor communicatively coupled to the memory, the camera 412, and the motion detector 414. The security device processor may locally process the images captured by the camera 412 to configure the operational status and sensitivity of the motion detection zones 802A-802E of the motion detector 414 in line with the teachings of the present disclosure. Alternatively, or in addition, in embodiments all or part of the functionality of the AI learning module 422 may be included within the client application 420 (see FIG. 4) running on the client device 404, wherein certain functionality of the AI learning module 422 is performed by the client device 404.

In some embodiments, the security device 402 may include a speaker for outputting audible instructions to the user 418. For example, in embodiments, in addition to or in lieu of the instruction 1206 (FIG. 12), an audible instruction may be output from the security device 402 that instructs the user 418 to stand a predefined distance (e.g., 10 feet or another distance) in front of the camera 412. Alternatively, or in addition, in embodiments the client device 404 may include a speaker for audibly instructing the user to stand a predefined distance in front of the camera 412.

Because the zones 802A-802E represent a three-dimensional area in which motion is to be detected, in embodiments, the image processor 424 may isolate the user 418 and other features (e.g., exempt areas) in the image 1302 as discussed above, and the configurator 432 may use the known and estimated information (e.g., the distance between the user 418 and the camera 412, the distance between the camera 412 and an exempt area, the direction of the exempt area and the camera 412, etc.) to generate a three-dimensional model of the environment 417 from the image 1302, and then generate the parameters 415 from the three-dimensional model to configure the sensitivity and the operational states of the zones 802 of the motion detector 414.

System/Device

Figure 23:
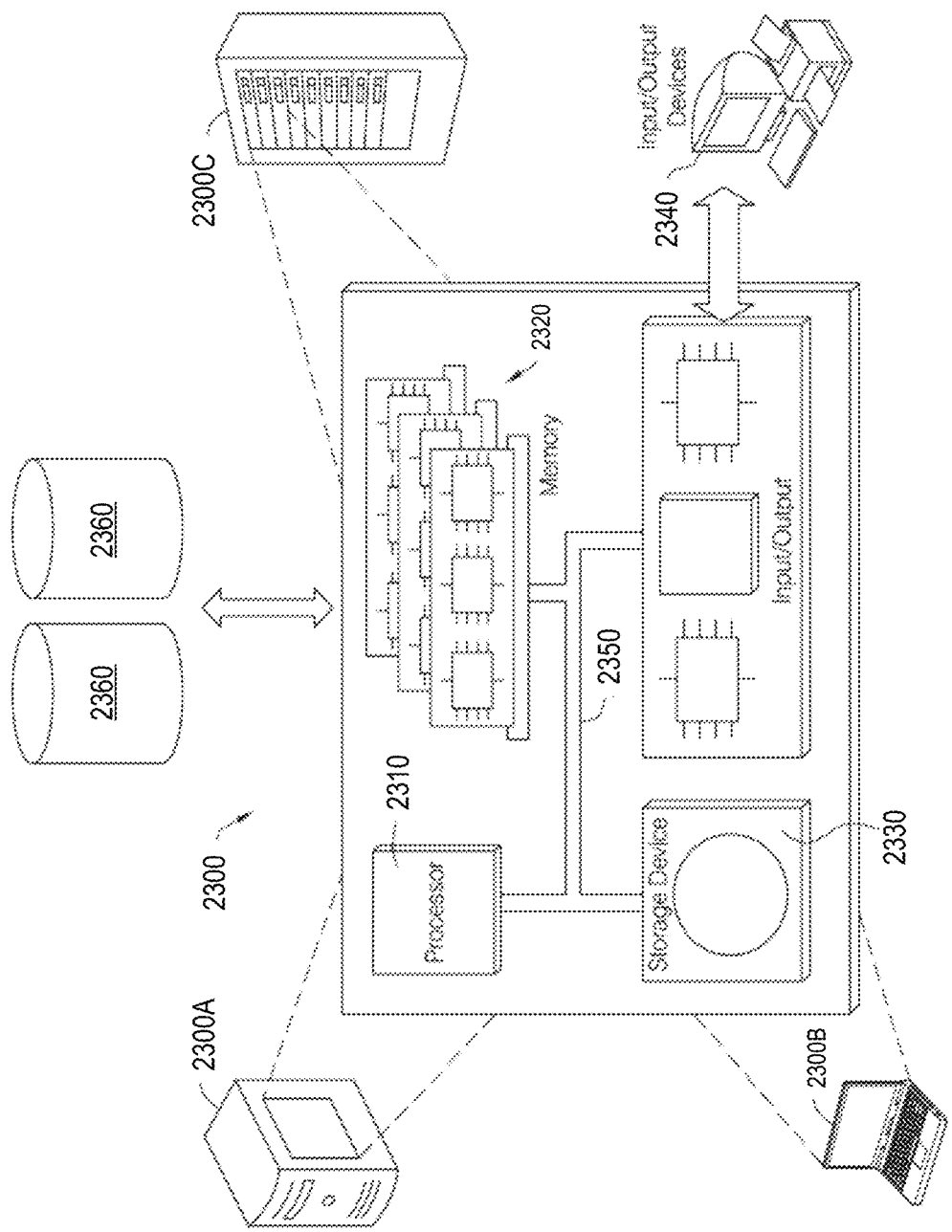
FIG. 23 is a functional block diagram of a system on which the present embodiments may be implemented according to various aspects of present disclosure.

FIG. 23 is a functional block diagram of a system 2300 on which the present embodiments may be implemented according to various aspects of the present disclosure. For example, the system 2300 may be or may include all or part of the security device 100, the client device 114, the storage device 116, the server 118, the security device 402, the client device 404, the server 406, the storage device 408, etc. The computer system 2300 may be embodied in at least one of a personal computer (also referred to as a desktop computer) 2300A, a portable computer (also referred to as a laptop or notebook computer) 2300B, and/or a server 2300C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 2300 may execute at least some of the operations described above. The computer system 2300 may include at least one processor 2310, a memory 2320, at least one storage device 2330, and input/output (I/O) devices 2340. Some or all of the components 2310, 2320, 2330, 2340 may be interconnected via a system bus 2350. The processor 2310 may be single- or multi-threaded and may have one or more cores. The processor 2310 may execute instructions, such as those stored in the memory 2320 and/or in the storage device 2330. Information may be received and output using one or more of the I/O devices 2340.

The memory 2320 may store information, and may be a computer-readable medium, such as volatile or non-volatile memory. The storage device(s) 2330 may provide storage for the computer system 2300, and may be a computer-readable medium. In various embodiments, the storage device(s) 2330 may be one or more of a flash memory device, a hard disk device, an optical disk device, a tape device, or any other type of storage device.

The I/O devices 2340 may provide input/output operations for the computer system 2300. The I/O devices 2340 may include a keyboard, a pointing device, and/or a microphone. The I/O devices 2340 may further include a display unit for displaying graphical user interfaces, a speaker, and/or a printer. External data may be stored in one or more accessible external databases 2360.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

EXAMPLE EMBODIMENTS

Figure 24:
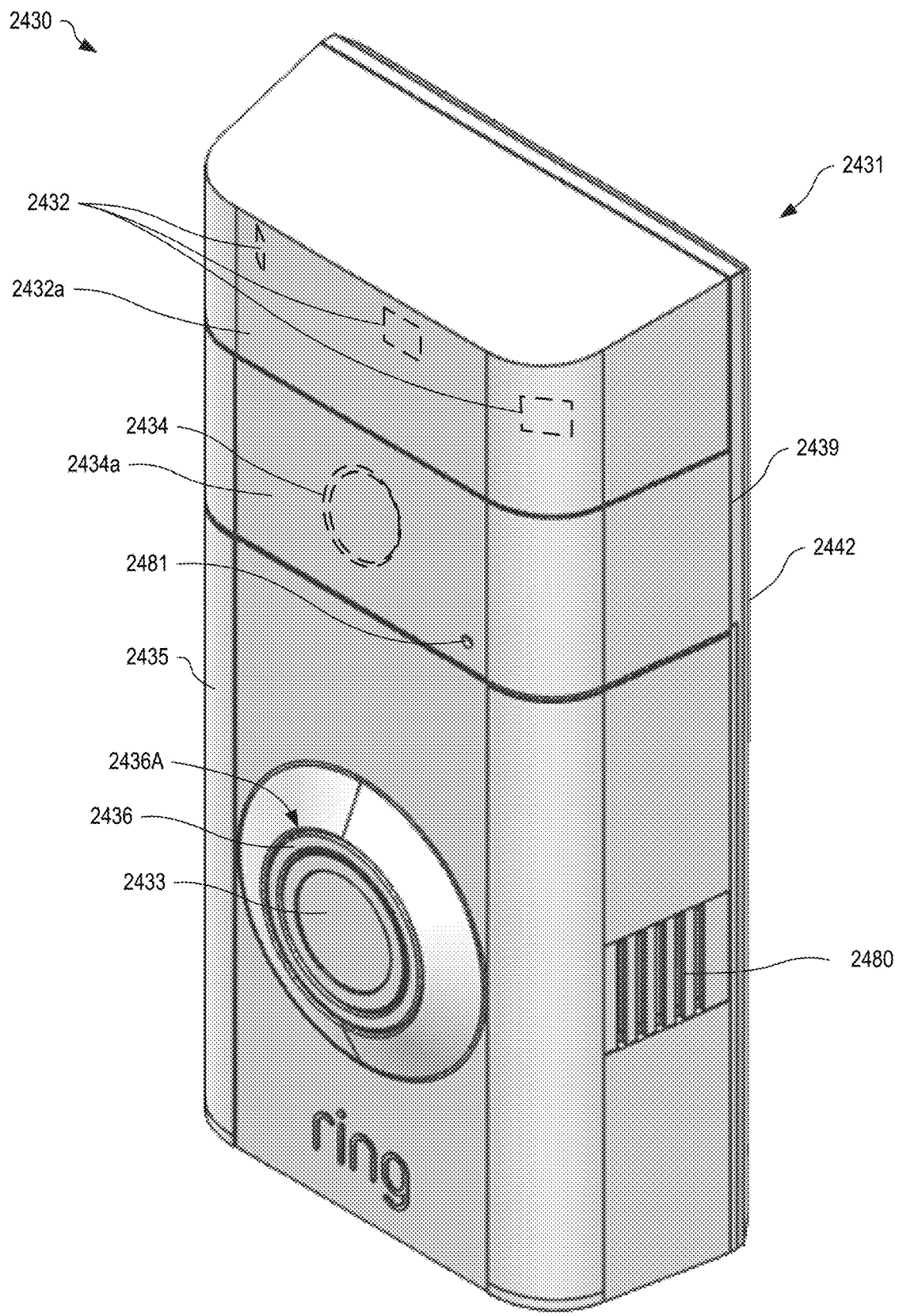
FIG. 24 is a front perspective view of the A/V recording and communication device of FIG. 1 implemented as a doorbell, in an embodiment.

FIG. 24 is a front perspective view of a doorbell 2430 that represents one example implementation of the security device 100 of FIG. 1. The device 2430 has a housing 2431 that includes a backplate 2439, a faceplate 2435 with a button 2433, an optically-transparent lens 2434*a* positioned in front of a camera 2434, and an infrared-transparent lens 2432*a* positioned in front of at least one motion sensor 2432. The housing 2431 may be further configured with an aperture 2481 to allow sound to enter the housing 2431 for detection by a microphone. The device 2430 may also include a mounting bracket 2442 that couples with the backplate 2439 to facilitate mounting of the device 2430 on a flat surface, such as the exterior of a building, such as a home or office. For example, the mounting bracket 2442 may be selected for mounting to surfaces of various composition, including, without limitation, wood, concrete, stucco, brick, vinyl siding, aluminum siding, etc., with any suitable fasteners, such as screws, or interference connections, adhesives, etc. The device 2430 may couple to the mounting bracket 2442 using any suitable fasteners, such as screws, or interference connections, mating hooks and apertures, adhesives, etc. The backplate 2439 may include screw terminals configured to receive electrical wires adjacent a mounting surface of the device 2430. The device 2430 may receive electrical power through the screw terminals and/or the device 2430 may control electrical connectivity of the screw terminals to cause a conventional doorbell to sound if so connected to the wires.

The faceplate 2435 may extend from the bottom of the device 2430 up to just below the camera 2434. The faceplate 2435 may be formed of any suitable material, including, without limitation, metals, such as brushed aluminum or stainless steel, metal alloys, and plastics, and any combination thereof. The faceplate 2435 protects the internal contents of the device 2430 and serves as an exterior front surface of the device 2430. The faceplate 2435 may include an aperture 2436a with a flexible translucent membrane 2436 for movably holding the button 2433. The faceplate 2435 is also formed with at least one speaker grille 2480 to allow sound generated within the housing 2431 to exit. The button 2433 and the flexible translucent membrane 2436 may have various profiles that may or may not match the profile of the faceplate 2435. The flexible translucent membrane 2436 may comprise any suitable material, including, without limitation, a transparent silicone, plastic, or rubber, that is configured for allowing light produced within the device 2430 to pass through and is sufficiently flexible to allow the button 2433 to be pressed. The light may be produced by one or more light-emitting components, such as light-emitting diodes (LEDs), contained within the device 2430, as further described below. The button 2433 and/or the flexible translucent membrane 2436 contacts a switch cover located within the device 2430 when the button 2433 is pressed by a visitor. When pressed, the button 2433 may trigger one or more functions of the device 2430, as further described below.

The motion sensor 2432 may be, for example, one or more passive infrared (PIR) sensors that detect motion using the infrared wavelength, but may be any type of sensor configured for detecting and communicating the presence of motion and/or a heat source within their field of view. The motion sensor 2432 may be configured to detect motion using any methodology, including but not limited to methodologies that do not rely on detecting the presence of a heat source within a field of view, without departing from the scope hereof. In certain embodiments, the infrared-transparent lens 2432a may be a Fresnel lens patterned to focus incoming light onto the at least one motion sensor 2432 located within the device 2430. The infrared transparent lens 2432a may be substantially coplanar with a front surface of the housing 2431. In alternative embodiments, the infrared-transparent lens 2432a may be recessed within the housing 2431 or may protrude outward from the housing 2431. The infrared-transparent lens 2432a may extend and curl partially around the side of the device 2430 without departing from the scope hereof. The at least one motion sensor 2432 is configured to sense a presence and/or motion of an object in front of the device 2430. In certain embodiments, the optically-transparent lens 2434a may be configured for focusing light into the camera 2434 so that clear images may be taken. The camera 2434 is configured for capturing video data when activated.

Floodlight Embodiment

Figure 25:
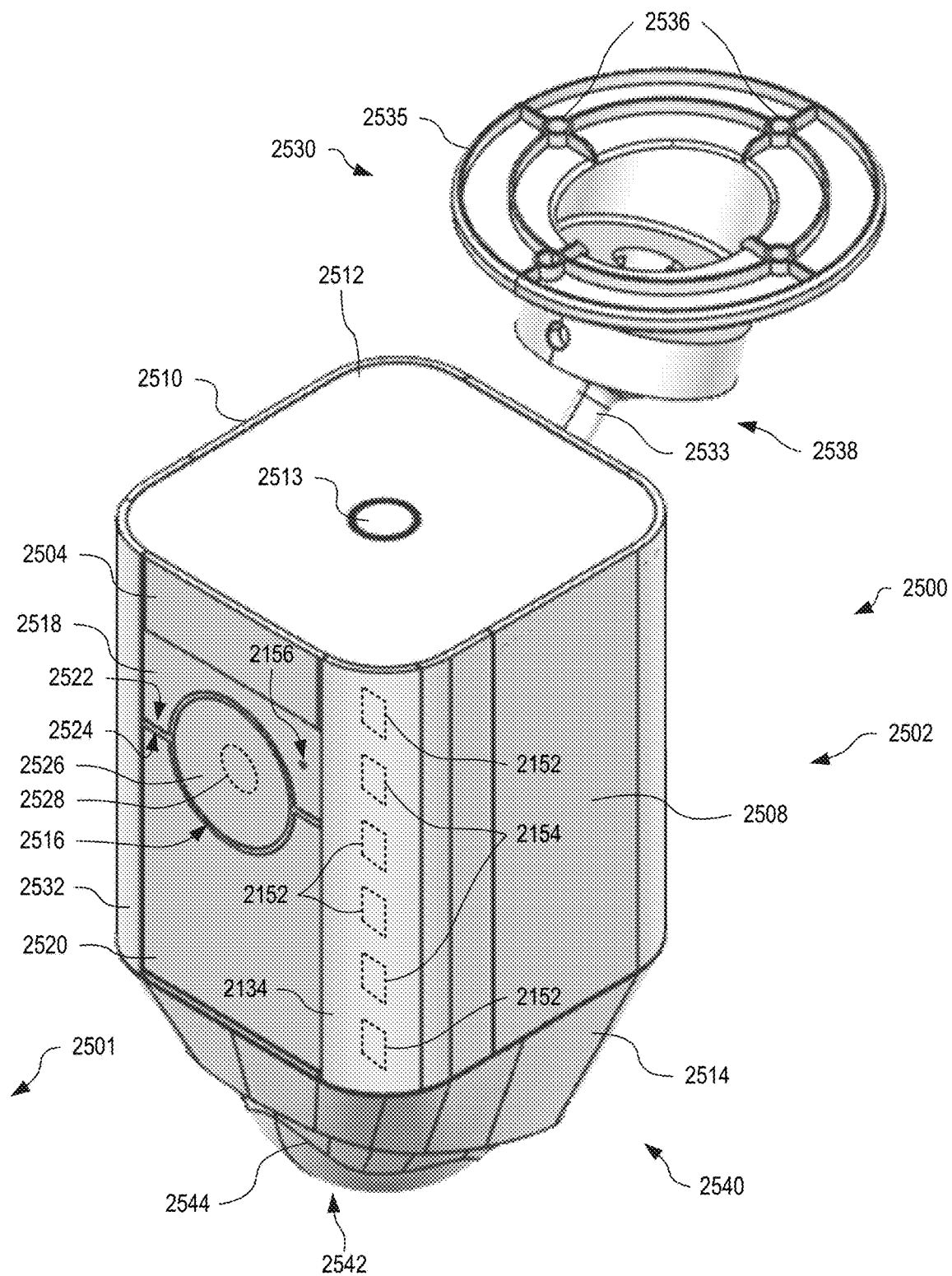
FIG. 25 is a front perspective view of the A/V recording and communication device of FIG. 1 implemented as a security camera and floodlight-controlling device, in an embodiment, in combination with mounting hardware.

FIG. 25 is a front perspective view of a security device 2500 that represents one example implementation of the security device 100 of FIG. 1. The security device 2500 is configured with a housing 2502 for containing and protecting the interior components of the security device 2500. The housing 2502 includes a front wall 2504, a rear wall 2506, opposing sidewalls 2508 (right), 2510 (left), an upper wall 2512, and a tapered lower portion 2514. The front wall 2504 forms a central opening 2516 that receives an upper shield 2518 and a lower grille 2520. In the illustrated embodiment, front surfaces of the upper shield 2518 and the lower grille 2520 are substantially flush with a front surface of the front wall 2504, but in alternative embodiments, these surfaces may not be flush with one another. The upper shield 2518 is substantially rectangular with a semicircular indentation along its lower edge 2522. The lower grille 2520 is substantially rectangular, and includes a semicircular indentation along its upper edge 2524. Together, the semicircular indentations in the upper shield 2518 and the lower grille 2520 form a circular opening that accommodates a cover 2526. The upper shield 2518, the lower grille 2520, and the cover 2526 are described in further detail below.

A camera 2528 is positioned behind the cover 2526 with a field of view of a monitored area 2501 to the front of the security device 2500 through the circular opening formed by the upper shield 2518 and the lower grille 2520. The cover 2526 is preferably transparent or translucent so that it does not interfere with the field of view of the camera 2528. For example, in certain embodiments the cover 2526 may comprise colorless glass or plastic.

The security device 2500 has a plurality of visible light emitting elements 2552 and infrared light emitting elements 2554 that are positioned behind right and left front corner shields 2532, 2534. For clarity of illustration, the visible light emitting elements 2552 and the infrared light emitting elements 2554 are shown only behind right corner shield 2534; the visible light emitting elements 2552 and the infrared light emitting elements 2554 are similarly positioned behind the left corner shield 2532. The corner shields 2532, 2534 may be formed of a material that is transparent to light within both the visible spectrum and the infrared spectrum. In certain embodiments, the corner shields 2532, 2534 are formed of a clear plastic (e.g., polycarbonate) or glass. The corner shields 2532, 2534, therefore, do not significantly interfere with transmission of light from the visible light emitting elements 2552 and the infrared light emitting elements 2554 into the monitored area 2501. The infrared light emitting elements 2554, in conjunction with operation of the camera 2528, facilitates night vision functionality of the security device 2500.

An input device 2513 is positioned on the upper wall 2512 of the housing 2502 such that it is accessible by the user. The input device 2513 may be, for example, a button connected to an electrical switch that provides an input to a processor of security device 2500.

The security device 2500 includes at least two microphones. The first microphone is positioned at the front of the security device 2500 and is aligned with a first microphone aperture 2556 within the upper shield 2518. The second microphone is positioned at the left side of the security device 2500 and is aligned with a second microphone aperture in the left sidewall 2510 of the housing 2502.

The tapered lower portion 2514 includes an opening to receive the motion sensor cover 2544, which is convexly shaped to cover and close the lower end opening of the tapered lower portion 2514. The motion sensor cover 2544 may include a Fresnel lens 2542 that is configured to focus and concentrate incoming infrared light onto a motion sensor (e.g., PIR sensors, now shown) located within the tapered lower portion 2514, thereby enhancing the effectiveness and/or sensitivity of the motion sensor. In alternative embodiments, the motion sensor cover 2544 may not include a Fresnel lens.

The motion sensor cover 2544 and the tapered lower portion 2514 couple with a plate to form a battery access door 2540 within the housing 2502 that provides access to removable battery casings configured within housing 2502. This configuration is well suited to a typical use case for the security device 2500, since floodlights are typically located above the head level of a person of average height. A person (or other object) moving at ground level within the monitored area 2501 is thus likely to be well within the field of view of the motion sensor.

The security device 2500 configured with coupling hardware 2530 that may be used to attach the security device 2500 to a supporting structure (not shown). For example, the coupling hardware 2530 may be used to secure the security device 2500 to a wall, a ceiling, a frame, a post, a gate, and so on. In the illustrated embodiment, the coupling hardware 2530 has a first connecting member 2533 secured to the rear wall 2506 of the housing 2502 and a second connecting member 2535 configured for securing to the supporting structure. For example, the second connecting member 2535 may include one or more apertures 2536 that allow the second connecting member 2535 to be screwed or nailed to the supporting structure. The first and second connecting members 2533, 2535 meet at a ball-and-socket joint 2538 that allows the first and second connecting members 2533, 2535 to articulate with respect to one another such that the security device 2500 may be oriented as desired. The ball-and-socket joint 2538 is, however, just one non-limiting example. In alternative embodiments, other types of joints may be provided between the first and second connecting members 2533, 2535, including non-articulating joints. In further alternative embodiments, the coupling hardware 2530 may comprise a single unitary member, rather than the first and second connecting members 2533, 2535.

In certain embodiments, the security device 2500 is configured to control an external illumination source that is adapted to be reoriented, the external floodlights may work in conjunction with the integral illumination source (e.g., the visible light emitting elements 2552 and the infrared light emitting elements 2554) to illuminate a broader area around the security device 2500, thereby providing greater security and a larger area for video surveillance and recording. For example, the user may orient the security device 2500 such that the integral illumination source points straight ahead and reorient the external illumination source to point to the sides of the area illuminated by the integral illumination source, thereby illuminating a broader area.

In a first aspect, a security device with motion detection configuration comprises a camera configured to capture an image of an environment in front of the security device. The security device has a motion detector for detecting motion within the environment, and a processor communicatively coupled with the camera and the motion detector. The security device includes a memory communicatively coupled with the processor. The memory comprises machine-readable instructions that, when executed by the processor, control the processor to output audible instructions from the security device. The machine-readable instructions control the processor to instruct a person to stand in front of, and at a predefined distance from, the security device. The machine-readable instructions cause the processor to control the camera to capture an image and send the image to a processing device remote from the security device. The machine-readable instructions control the processor to receive, from the processing device, parameters for configuring the motion detector based upon isolating the person within the image, the predefined distance, and an exempt area detected within the image. The machine-readable instructions control the processor to configure the motion detector based upon the parameters.

In an embodiment of the first aspect, the motion detector is a passive infrared (PIR) motion detector.

In another embodiment of the first aspect, the parameters configure the motion detector to ignore motion within the exempt area.

In another embodiment of the first aspect, the processing device comprises one of a client device in communication with the security device and a back-end server in communication with the security device.

In a second aspect, a system for configuring motion detection of a security device having a motion detector and a camera comprises a processor and a memory. The memory stores machine-readable instructions that, when executed by the processor, operate to control the camera to capture an image of a person standing a predefined distance in front of the security device. The machine-readable instructions operate to process the image to isolate the person in the image and determining a pixel-distance relationship for the image based upon the isolated person and the predefined distance. The machine-readable instructions operate to process the image to isolate an exempt area for exclusion from motion detection, and process the image to determine a distance and a direction of the exempt area from the security device. The machine-readable instructions operate to determine an operational state for each of a plurality of motion detection zones of the motion detector based upon the distance and the direction. The machine-readable instructions operate to determine a sensitivity setting for the motion detector based upon the distance and the direction. The machine-readable instructions further operate to configure the motion detector based upon the operational state for each of the motion detection zones and the sensitivity setting.

In an embodiment of the second aspect, the motion detector is a passive infrared (PIR) motion detector.

In a third aspect, a method for configuring motion detection of a security device having a motion detector and a camera comprises controlling the camera to capture an image of a person standing a predefined distance in front of the security device. The method includes processing the image to isolate the person in the image, and determining a pixel-distance relationship for the image based upon the isolated person and the predefined distance. The method comprises processing the image to isolate an exempt area for exclusion from motion detection. The method includes processing the image to determine a distance and a direction of the exempt area from the security device. The method includes determining an operational state for each of a plurality of motion detection zones of the motion detector based upon the distance and the direction. The method comprises determining a sensitivity setting for the motion detector based upon the distance and the direction, and configuring the motion detector based upon the operational state for each of the motion detection zones and the sensitivity setting.

In an embodiment of the third aspect, the motion detector is a passive infrared (PIR) motion detector.

In another embodiment of the third aspect, the method comprises determining a mounting height of the security device based upon a location of the isolated person within the image and determining a maximum range of the motion detector based upon the mounting height. The sensitivity setting is adjusted based upon the maximum range, the distance, and the direction.

In another embodiment of the third aspect, the determining of the mounting height further comprises determining a pixel location of the isolated person within the image. Where the pixel location is below a predefined vertical pixel location within the image, instructions are provided to add a wedge component to a mounting of the security device to orient the camera downward.

In another embodiment of the third aspect, the exempt area corresponds to a feature selected from the group including a street, a path, a parking area, a tree, a heating vent, a playground, and a heat source.

In another embodiment of the third aspect, the processing of the image to determine distance and direction comprises processing the image to detect edges indicative of a feature and determining pixel locations of the edges within the image to determine the exempt area. The processing includes determining the distance and the direction based upon the exempt area and the pixel-distance relationship.

In another embodiment of the third aspect, the exempt area corresponds to a street. The method includes determining an angle of the street relative to the security device and determining whether the street is within range of the motion detector. When the street is within range, sensitivity setting of the motion detector and the operational status of each of the motion detection zones is determined based upon the distance, the direction, and the angle.

In another embodiment of the third aspect, determination of the angle comprises fitting, within the image, a straight line to the street. The method includes determining a left pixel height where an extension of the straight line intersects a left edge of the image, and determining a right pixel height where the extension of the straight line intersects a right edge of the image. The method comprises determining the street angle based upon the left pixel height and the right pixel height.

In another embodiment of the third aspect, the motion detector is configured to ignore motion within the exempt area.

In another embodiment of the third aspect, the processing of the image to isolate the person comprises detecting the person within the image based upon facial recognition.

In another embodiment of the third aspect, determining the pixel-distance relationship comprises determining a pixel location within the image of at least one foot of the isolated person. Determining the pixel distance relationship includes determining the pixel-distance relationship based upon the pixel location within the image and an imaging equation of the camera.

In another embodiment of the third aspect, determining the pixel-distance relationship comprises searching the image for a known object proximate the isolated person and determining a pixel size of the known object within the image. Determining the pixel-distance relationship includes determining the pixel-distance relationship based upon the pixel size, the predefined distance, and an imaging equation of the camera.

In another embodiment of the third aspect, when the exempt area cannot be isolated within the image, the image is displayed to the user and the user is instructed to indicate the exempt area within the image. The method includes receiving input from the user indicating the exempt area within the image.

In a fourth aspect, a method for configuring motion detection of a security device having a motion detector and a camera comprises controlling the camera to capture an image of a person standing a predefined distance in front of the security device. The method includes processing the image to isolate the person in the image, and determining a pixel-distance relationship for the image based upon the predefined distance and the isolated person. The method comprises generating a 3D model of an environment in front of the security device based upon the pixel-distance relationship and a plurality of features identified within the image, and determining an operational state for each of a plurality of motion detection zones of the motion detector based upon the 3D model. The method comprises determining a sensitivity setting for the motion detector based upon the 3D model and a range of the motion detector, and configuring the motion detector based upon the operational state for each of the motion detection zones and the sensitivity setting.

In an embodiment of the fourth aspect, the motion detector is a passive infrared (PIR) motion detector.

In a fifth aspect, a method for using a client device to configure motion detection of a security device having a motion detector and a camera comprises providing a client device interface for communicating with the security device. The method includes using the client device interface to instruct a person to stand a predefined distance in front of the security device. The method comprises controlling the security device to capture an image using the camera. The method includes transmitting the image to the client device. The method comprises using a processor of the client device to execute machine-readable instructions to: (a) process the image to isolate the person in the image; (b) determine a pixel-distance relationship for the image based upon the isolated person and the predefined distance; (c) process the image to isolate an exempt area for exclusion from motion detection; (d) process the image to determine a distance and a direction of the exempt area from the security device; (e) determine an operational state for each of a plurality of motion detection zones of the motion detector based upon the distance and the direction; (f) determine a sensitivity setting for the motion detector based upon the distance and the direction; (g) determine parameters for the motion detector based upon the operational state for each of the motion detection zones and the sensitivity setting; and (h) send the parameters to the security device to configure the motion detector.

In an embodiment of the fifth aspect, the motion detector is a passive infrared (PIR) motion detector.

In a sixth aspect, a method for configuring motion detection of a security device having a motion detector and a camera comprises instructing, using a client device, a person to stand a predefined distance in front of the security device. The method includes controlling, from the client device, the security device to capture an image using the camera. The method comprises receiving, at the client device, the image from the security device. The method includes processing, by the client device, the image to isolate the person in the image and determining a pixel-distance relationship for the image based upon the isolated person and the predefined distance. The method comprises processing the image to isolate an exempt area for exclusion from motion detection, and processing the image to determine a distance and a direction of the exempt area from the security device. The method includes determining an operational state for each of a plurality of motion detection zones of the motion detector based upon the distance and the direction, and determining a sensitivity setting for the motion detector based upon the distance and the direction. The method comprises determining parameters for the motion detector based upon the operational state for each of the motion detection zones and the sensitivity setting, and sending the parameters to the security device to configure the motion detector.

In an embodiment of the sixth aspect, the motion detector is a passive infrared (PIR) motion detector.

In another embodiment of the sixth aspect, when the exempt area cannot be isolated within the image, the image is displayed on a display of the client device. The user of the client device is instructed to indicate the exempt area on the displayed image. The exempt area is captured based upon the input from the user.

In another embodiment of the sixth aspect, the method includes determining, by the client device, a mounting height of the security device based upon a location of the isolated person within the image. The method comprises determining a maximum range of the motion detector based upon the mounting height. The sensitivity setting is adjusted based upon the maximum range, the distance, and the direction.

In another embodiment of the sixth aspect, the determination of the mounting height further comprises determining a pixel location of the isolated person within the image. Where the pixel location is below a predefined vertical pixel location within the image, instructions to the user are displayed to add a wedge component to a mounting of the security device to orient the camera downward.

In another embodiment of the sixth aspect, the exempt area corresponds to a feature selected from the group including a street, a path, a parking area, a tree, a heating vent, a playground, and a heat source.

In another embodiment of the sixth aspect, the processing of the image to determine distance and direction comprises processing the image to detect edges indicative of a feature, and determining pixel locations of the edges within the image to determine the exempt area. The process of the image includes determining the distance and the direction based upon the exempt area and the pixel-distance relationship.

In another embodiment of the sixth aspect, where the exempt area corresponds to a street, an angle of the street relative to the security device is determined. A determination is made regarding whether the street is within range of the motion detector. When the street is within range, the sensitivity setting of the motion detector and the operational status of each of the motion detection zones based upon the distance, the direction, and the angle is determined.

In another embodiment of the sixth aspect, the determination of the angle comprises fitting, within the image, a straight line to the street, and determining a left pixel height where an extension of the straight line intersects a left edge of the image. The determination comprises determining a right pixel height where the extension of the straight line intersects a right edge of the image. The method includes determining the street angle based upon the left pixel height and the right pixel height.

In another embodiment of the sixth aspect, the motion detector is configured to ignore motion within the exempt area.

In another embodiment of the sixth aspect, the processing of the image to isolate the person comprises detecting the person within the image based upon facial recognition.

In another embodiment of the sixth aspect, determining the pixel-distance relationship comprises determining, by the client device, a pixel location within the image of at least one foot of the isolated person and determining the pixel-distance relationship based upon the pixel location within the image and an imaging equation of the camera.

In another embodiment of the sixth aspect, determining the pixel-distance relationship comprises searching, by the client device, the image for a known object proximate the isolated person and determining a pixel size of the known object within the image. Determination of the pixel-distance includes determining the pixel-distance relationship based upon the pixel size, the predefined distance, and an imaging equation of the camera.

In a seventh aspect, a method for configuring motion detection of a security device having a motion detector and a camera comprises instructing, using a client device, a person to stand a predefined distance in front of the security device. The method includes controlling, from the client device, the security device to capture an image using the camera, and receiving, at the client device, the image from the security device. The method comprises processing, by the client device, the image to isolate the person in the image, and determining a pixel-distance relationship for the image based upon the predefined distance and the isolated person. The method includes generating a 3D model of an environment in front of the security device based upon the pixel-distance relationship and a plurality of features identified within the image, and determining an operational state for each of a plurality of motion detection zones of the motion detector based upon the 3D model. The method comprises determining a sensitivity setting for the motion detector based upon the 3D model and a range of the motion detector, and determining parameters for the motion detector based upon the operational state for each of the motion detection zones and the sensitivity setting. The method includes sending the parameters to the security device to configure the motion detector.

In an embodiment of the seventh aspect, the motion detector is a passive infrared (PIR) motion detector.

In an eight aspect, a security device having motion detection configuration comprises a camera configured to capture images of an environment in front of the security device. The security device includes a motion detector for detecting motion within the environment and a processor communicatively coupled with the camera and the motion detector. The security device has a memory communicatively coupled with the processor. The memory stores machine-readable instructions that, when executed by the processor, operate to: (a) output audible instructions from the security device to instruct a person to stand in front of, and at a predefined distance from, the security device; (b) control the camera to capture an image; (c) send the image to a processing device remote from the security device; (d) receive, from the processing device, parameters for configuring the motion detector based upon the person isolated within the image, the predefined distance, and an exempt area detected within the image; and (e) configure the motion detector based upon the parameters.

In an embodiment of the eight aspect, the motion detector is a passive infrared (PIR) motion detector.

In a ninth aspect, a method for configuring motion detection of a security device having a motion detector and a camera comprises outputting audible instructions from the security device to instruct a person to stand in front of, and at a predefined distance from, the security device. The method includes controlling the camera to capture an image and sending the image to a processing device remote from the security device. The method comprises receiving, from the processing device, parameters for configuring the motion detector based upon the person isolated within the image, the predefined distance, and an exempt area detected within the image. The method comprises configuring the motion detector based upon the parameters.

In an embodiment of the ninth aspect, the motion detector is a passive infrared (PIR) motion detector.

In another embodiment of the ninth aspect, the parameters configure the motion detector to ignore motion within the exempt area.

In another embodiment of the ninth aspect, the processing device comprising one of a client device in communication with the security device and a back-end server in communication with the security device.

In a tenth aspect, a system for configuring motion detection of a security device having a motion detector and a camera comprises an interface for communicating with the security device and a processor communicatively coupled with the interface. The system has a memory communicatively coupled with the processor. The memory stores machine-readable instruction that, when executed by the processor, operate to: (a) receive an image captured by the camera of a person standing in front of the security device at a predefined distance from the security device; (b) process the image to isolate the person in the image; (c) determine a pixel-distance relationship for the image based upon the isolated person and the predefined distance; (d) process the image to isolate an exempt area for exclusion from motion detection; (e) process the image to determine a distance and a direction of the exempt area from the security device; (f) determine an operational state for each of a plurality of motion detection zones of the motion detector based upon the distance and the direction; (g) determine a sensitivity setting for the motion detector based upon the distance and the direction; (h) determine parameters for the motion detector based upon the operational state for each of the motion detection zones and the sensitivity setting; and (i) send the parameters to the security device to configure the motion detector to ignore motion in the exempt area.

In an embodiment of the tenth aspect, the motion detector is a passive infrared (PIR) motion detector.

In an eleventh aspect, a method for configuring motion detection of a security device having a motion detector and a camera comprises receiving, at a processing device remote from the security device, an image captured by the camera of a person standing in front of the security device at a predefined distance from the security device. The method includes processing the image to isolate the person in the image, and determining a pixel-distance relationship for the image based upon the isolated person and the predefined distance. The method comprises processing the image to isolate an exempt area for exclusion from motion detection, and processing the image to determine a distance and a direction of the exempt area from the security device. The method comprises determining an operational state for each of a plurality of motion detection zones of the motion detector based upon the distance and the direction. The method includes determining a sensitivity setting for the motion detector based upon the distance and the direction, and determining parameters for the motion detector based upon the operational state for each of the motion detection zones and the sensitivity setting. The method comprises sending the parameters to the security device to configure the motion detector to ignore motion in the exempt area.

In an embodiment of the eleventh aspect, the motion detector is a passive infrared (PIR) motion detector.

In another embodiment of the eleventh aspect, the method includes determining a mounting height of the security device based upon a location of the isolated person within the image, and determining a maximum range of the motion detector based upon the mounting height. The sensitivity setting is adjusted based upon the maximum range, the distance, and the direction.

In another embodiment of the eleventh aspect, the determining of the mounting height further comprises determining a pixel location of the isolated person within the image. When the pixel location is below a predefined vertical pixel location within the image, instructions are sent to the user to add a wedge component to a mounting of the security device to orient the camera downward.

In another embodiment of the eleventh aspect, the exempt area corresponds to a feature selected from the group including a street, a path, a parking area, a tree, a heating vent, a playground, and a heat source.

In another embodiment of the eleventh aspect, the processing of the image to determine distance and direction comprises processing the image to detect edges indicative of a feature, determining pixel locations of the edges within the image to determine the exempt area, and determining the distance and the direction based upon the exempt area and the pixel-distance relationship.

In another embodiment of the eleventh aspect, when the exempt area corresponds to a street, an angle of the street relative to the security device is determined. It is further determined whether the street is within range of the motion detector. When the street is within range, the sensitivity setting of the motion detector and the operational status of each of the motion detection zones based upon the distance, the direction, and the angle is determined.

In another embodiment of the eleventh aspect, the determining of the angle comprises: (a) fitting, within the image, a straight line to the street; (b) determining a left pixel height where an extension of the straight line intersects a left edge of the image; (c) determining a right pixel height where the extension of the straight line intersects a right edge of the image; and (d) determining the street angle based upon the left pixel height and the right pixel height.

In another embodiment of the eleventh aspect, the processing of the image to isolate the person comprises detecting the person within the image based upon facial recognition.

In another embodiment of the eleventh aspect, determining the pixel-distance relationship comprises determining a pixel location within the image of at least one foot of the isolated person, and determining the pixel-distance relationship based upon the pixel location within the image and an imaging equation of the camera.

In another embodiment of the eleventh aspect, determining the pixel-distance relationship comprises searching the image for a known object proximate the isolated person, determining a pixel size of the known object within the image, and determining the pixel-distance relationship based upon the pixel size, the predefined distance, and an imaging equation of the camera.

In another embodiment of the eleventh aspect, when the exempt area is cannot be isolated within the image, the image is sent to a client device of a user, such that the image is displayed to the user with instructions to indicate the exempt area within the image. Input from the user indicating the exempt area within the image is received.

In a twelfth aspect, a method for configuring motion detection of a security device having a motion detector and a camera comprises receiving, by a processing device remote from the security device, an image captured by the camera of a person standing in front of the security device at a predefined distance from the security device. The method includes processing the image to isolate the person in the image and determining a pixel-distance relationship for the image based upon the predefined distance and the isolated person. The method comprises generating a 3D model of an environment in front of the security device based upon the pixel-distance relationship and a plurality of features identified within the image. The method includes determining an operational state for each of a plurality of motion detection zones of the motion detector based upon the 3D model and determining a sensitivity setting for the motion detector based upon the 3D model and a range of the motion detector. The method comprises determining parameters for the motion detector based upon the operational state for each of the motion detection zones and the sensitivity setting, and sending the parameters to the security device to configure the motion detection to ignore motion in the exempt area.

In an embodiment of the twelfth aspect, the motion detector is a passive infrared (PIR) motion detector.

In a thirteenth aspect, a security device with motion detection configuration comprises a camera configured to capture an image of an environment in front of the security device and a motion detector for detecting motion within the environment. The security device includes a processor communicatively coupled with the camera and the motion detector, and a memory communicatively coupled with the processor. The memory includes machine-readable instructions that, when executed by the processor, control the processor to: (a) output audible instructions from the security device for instructing a person to stand in front of, and at a predefined distance from, the security device; (b) control the camera to capture an image; (c) process the image to isolate the person within the image; and (d) determine parameters for configuring the motion detector based upon isolating the person within the image, the predefined distance, and an exempt area detected within the image.

In an embodiment of the thirteenth aspect, the motion detector is a passive infrared (PIR) motion detector.

In a fourteenth aspect, a security device having motion detection configuration comprises a camera configured to capture images of an environment in front of the security device and a motion detector for detecting motion within the environment. The security device includes a processor communicatively coupled with the camera and the motion detector and a memory communicatively coupled with the processor. The memory stores machine-readable instructions that, when executed by the processor, operate to: (a) output audible instructions from the security device to instruct a person to stand in front of, and at a predefined distance from, the security device; (b) control the camera to capture an image; (c) determine parameters for configuring the motion detector based upon isolating the person within the image, the predefined distance, and an exempt area detected within the image; and (d) configure the motion detector based upon the parameters.

In an embodiment of the fourteenth aspect, the motion detector is a passive infrared (PIR) motion detector.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Changes may be made in the above embodiments without departing from the scope hereof. The matter contained in the above description and/or shown in the accompanying drawings should be interpreted as illustrative and not in a limiting sense. The following claims are intended to cover all generic and specific features described herein, as well as all statements of the scope of the present embodiments, which, as a matter of language, might be said to fall therebetween.

What is claimed is:

1. A method for configuring motion detection of a security device having a motion detector and a camera, the method comprising:
    controlling the camera to capture an image including a person standing a predefined distance in front of the security device;
    processing an image captured by the camera to isolate a person depicted in the image;
    determining a pixel-distance relationship for the image based on the location of the person in the image and a predefined distance value corresponding to a distance that the person is standing away from the security device that captured the image;
    processing the image to identify an exempt area for exclusion from motion detection;
    processing the image to determine a distance and a direction of the exempt area from the security device;
    determining one or both of an operational state and a sensitivity setting for each of a plurality of motion detection zones of the motion detector based on the distance and the direction; and
    configuring the motion detector based on one or both of the operational state and the sensitivity setting for each of the motion detection zones.

2. The method of claim 1, wherein the motion detector is a passive infrared (PIR) motion detector.

3. The method of claim 1, further comprising:
    determining a maximum range of the motion detector based on a mounting height of the security device; and
    adjusting the sensitivity setting based on a the maximum range, the distance, and the direction.

4. The method of claim 3, further comprising
    determining a pixel location of the person within the image;
    determining that the pixel location is below a predefined vertical pixel location within the image; and
    providing instructions to add a wedge component to a mounting of the security device to orient the camera downward.

5. The method of claim 1, wherein the exempt area corresponds to a feature selected from the group including a street, a path, a parking area, a tree, a heating vent, a playground, and a heat source.

6. The method of claim 1, wherein the processing of the image to determine distance and direction comprises:
    processing the image to detect edges indicative of a feature;

determining pixel locations of the edges within the image to determine the exempt area; and determining the distance and the direction based on the exempt area and the pixel-distance relationship.

7. The method of claim 1, further comprising:
determining that the exempt area corresponds to a street;
determining an angle of the street relative to the security device;
determining that the street is within range of the motion detector; and
determining the sensitivity setting of the motion detector and the operational status of each of the motion detection zones based on the distance, the direction, and the angle.

8. The method of claim 7, wherein the determining of the angle comprises:
fitting, within the image, a straight line to the street;
determining a left pixel height where a left extension of the straight line intersects a left edge of the image;
determining a right pixel height where a right extension of the straight line intersects a right edge of the image; and
determining the street angle based on the left pixel height and the right pixel height.

9. The method of claim 1, wherein the motion detector is configured to ignore motion within the exempt area.

10. The method of claim 1, wherein the processing of the image to isolate the person comprises detecting the person within the image using face detection.

11. The method of claim 1, wherein determining the pixel-distance relationship comprises:
determining a pixel location within the image of at least one foot of the person; and
determining the pixel-distance relationship based on the pixel location within the image of the at least one foot of the person and an imaging equation of the camera.

12. The method of claim 1, wherein determining the pixel-distance relationship comprises:
searching the image for a known object proximate the person;
determining a pixel size of the known object within the image; and
determining the pixel-distance relationship based on the pixel size, the predefined distance, and an imaging equation of the camera.

13. The method of claim 1, wherein processing the image to isolate the exempt area comprises displaying the image on a screen of a client device and interacting with a user of the client device to define the exempt area on the image.

14. The method of claim 1 wherein processing the image to isolate the exempt area comprises displaying the image on a screen of a client device with a highlighted obstruction and receiving an input from the user indicating that the obstruction is the exempt area.

15. The method of claim 1, wherein processing the image to isolate the exempt area comprises:
displaying, on a screen of a client device, results including one or more of the distance, the direction, and a vertical distance between the security device and the ground surface; and
interacting with a user of the client device to accept or correct the results.

16. The method of claim 1, further comprising controlling the camera to capture the image.

17. The method of claim 1, further comprising determining a mounting height of the security device based on the height of the person depicted the image.

* * * * *